US006571061B2

(12) United States Patent
Kawasaki et al.

(10) Patent No.: US 6,571,061 B2
(45) Date of Patent: May 27, 2003

(54) UNIFORM FLASH-EMISSION CONTROLLER

(75) Inventors: Masahiro Kawasaki, Saitama (JP); Osamu Sato, Saitama (JP); Shigeru Iwamoto, Saitama (JP); Tadahisa Ohkura, Saitama (JP); Kazuhito Taneoka, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/939,701

(22) Filed: Aug. 28, 2001

(65) Prior Publication Data

US 2002/0044774 A1 Apr. 18, 2002

(30) Foreign Application Priority Data

Aug. 30, 2000 (JP) ....................................... 2000-260632

(51) Int. Cl.[7] ................................................ G03B 15/05
(52) U.S. Cl. ........................ 396/156; 396/172; 396/173
(58) Field of Search ................................ 396/156, 173, 396/172

(56) References Cited

U.S. PATENT DOCUMENTS 5,729,772 A 3/1998 Sato et al. .................. 396/159
6,009,281 A * 12/1999 Hosomizu et al. .......... 396/156
6,118,944 A 9/2000 Sato et al. ..................... 396/61

FOREIGN PATENT DOCUMENTS

JP 9-50068 2/1997 ........... G03B/15/05

* cited by examiner

*Primary Examiner*—W. B. Perkey
(74) *Attorney, Agent, or Firm*—Greenblum & Bernstein, P.L.C.

(57) ABSTRACT

A uniform flash-emission controller which controls an intensity of a light emission of a flashtube, the uniform flash-emission controller includes an IGBT which causes the flashtube to emit a rapid series of short flash pulses; an IGBT controller which switches the IGBT ON and OFF so as to maintain the intensity at a substantially constant level; and a latch for holding an ON state and an OFF state of the IGBT until a predetermined period of time elapses from a time the IGBT controller switches the IGBT ON and OFF, respectively.

11 Claims, 11 Drawing Sheets

16

18

UNIFORM FLASH-EMISSION CONTROLLER

BACKGROUND OF THE INVENTION

1. Field of the Invention

The present invention relates to a uniform flash-emission controller which controls a flash, or a strobe, so as to give off light with a uniform intensity for a given period of time via intermittent driving of an IGBT (Insulated Gate Bipolar transistor), wherein the IGBT is rapidly switched ON and OFF repetitively.

2. Description of the Related Art

A flash/strobe (e.g., a speedlite used for cameras) which is controlled so that the flashtube (e.g., a xenon flashtube) thereof gives off light with a uniform intensity for a given period of time is known in the art. Note that the use of the term ‘uniform intensity’ or ‘uniform flash emission’ refers to one kind of flash emission control used in high-speed synchronized photography, and can be also referred to as ‘flat emission’. Such a control is referred herein as a uniform flash-emission control. In the uniform flash-emission control, it is generally the case that the intensity of the light emission of the flashtube is controlled by an intermittent drive of an IGBT (Insulated Gate Bipolar transistor) wherein the IGBT is switched ON and OFF repetitively. Namely, the light emitted by the flashtube is received by a light-receiving element to be converted into a voltage signal, and the IGBT is switched ON and OFF repetitively in accordance with the output of a comparator which compares the voltage signal with a predetermined voltage. In this type of uniform flash-emission control using the IGBT, the IGBT needs to be switched ON and OFF at high speed. The flash can give light emission on the subject with less fluctuation in intensity as the control frequency for switching the IGBT ON and OFF becomes higher.

However, if the control frequency for the IGBT is high, the power loss due to the IGBT increases, and also the control frequency may exceed the maximum operable frequency of the IGBT. Accordingly, the IGBT gets damaged if the control frequency for the IGBT exceeds the maximum operable frequency thereof.

SUMMARY OF THE INVENTION

The object of the present invention is to provide a uniform flash-emission controller which controls a flash to give off light with a uniform intensity for a given period of time via an intermittent drive of an IGBT, wherein the IGBT is prevented from being damaged during the uniform flash-emission control.

To achieve the object mentioned above, according to an aspect of the present invention, a uniform flash-emission controller is provided, which controls an intensity of a light emission of a flashtube, the uniform flash-emission controller including an IGBT which causes the flashtube to emit a rapid series of short flash pulses; an IGBT controller which switches the IGBT ON and OFF so as to maintain the intensity at a substantially constant level; and a latch for holding an ON state and an OFF state of the IGBT until a predetermined period of time elapses from a time the IGBT controller switches the IGBT ON and OFF, respectively.

Preferably, the IGBT controller includes a detecting device for detecting the intensity of the light emission of the flashtube. The IGBT controller switches the IGBT OFF at a time the intensity detected by the detecting device exceeds a first predetermined intensity, and subsequently switches the IGBT ON at a time the intensity detected by the detecting device drops below a second predetermined intensity.

In an embodiment, the first predetermined intensity is identical to the second predetermined intensity.

According to another aspect of the present invention, a uniform flash-emission controller is provided, including an IGBT which causes the flashtube to emit a rapid series of short flash pulses; an IGBT controller which switches the IGBT ON and OFF so as to maintain intensity of a light emission of the flashtube at a substantially constant level; a detecting device for detecting the intensity of the light emission of the flashtube; a comparator which compares the intensity of the light emission detected by the detecting device with a predetermined intensity, and outputs a level signal responsive to the intensity of the light emission detected by the detecting device; a latch which latches the level signal, and outputs the level signal as one of an ON signal and an OFF signal to the IGBT to switch the IGBT ON and OFF, respectively; a switching device provided between the comparator and the latch; and a switch controller for holding the switching device in an OFF state so that one of the ON signal and the OFF signal, which is output from the latch, cannot change until a predetermined period of time elapses from the moment the level signal changes.

In an embodiment, the comparator outputs a high-level signal and a low-level signal in the case where the intensity of the light emission detected by the detecting device is greater and less than the predetermined intensity, respectively. The IGBT controller switches the IGBT ON to thereby cause the flashtube to emit light when the latch latches the high-level signal to output the ON signal to the IGBT. The IGBT controller switches the IGBT OFF to thereby cause the flashtube to stop emitting light when the latch latches the low-level signal to output the OFF signal to the IGBT.

In an embodiment, the predetermined period of time corresponds to a maximum operable frequency of the IGBT.

Preferably, the switching device includes a first buffer which inputs the level signal output from the comparator, the first buffer including an input terminal which inputs a signal output from the switching controller.

Preferably, the latch includes a second buffer, and a resistor which is connected between input and output terminals of the second buffer so that an output of the second buffer is fed back to the input terminal of the second buffer via the resistor.

Preferably, the switch controller includes an RC circuit which is connected to an output port of the latch, the predetermined period of time being determined by a time constant of the RC circuit.

Preferably, the uniform flash-emission controller further includes a flash controller which determines the intensity of the light emission of the flashtube and a duration of the light emission of the flashtube to control a commencement of the light emission of the flashtube and a termination of the light emission of the flashtube.

Preferably, the flash controller outputs a light-emission stop signal for terminating the light emission of the flashtube to the latch via the switching device upon a lapse of the duration of the light emission of the flashtube; wherein the light-emission stop signal is output to the IGBT via the latch without delay when the switching device is in an ON state. When the switching device is in the OFF state, the light-emission stop signal is output to the IGBT upon a change of a state of the switching device from the OFF state to the ON state after the predetermined period of time elapses.

The present disclosure relates to subject matter contained in Japanese Patent Application No.2000-260632 (filed on Aug. 30, 2000), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

In the following descriptions, the logic level of a low-level (ground-level) voltage is represented by "0", while the logic level of a high-level voltage is "1" with respect to the illustrated circuits and elements.

Figure 1:
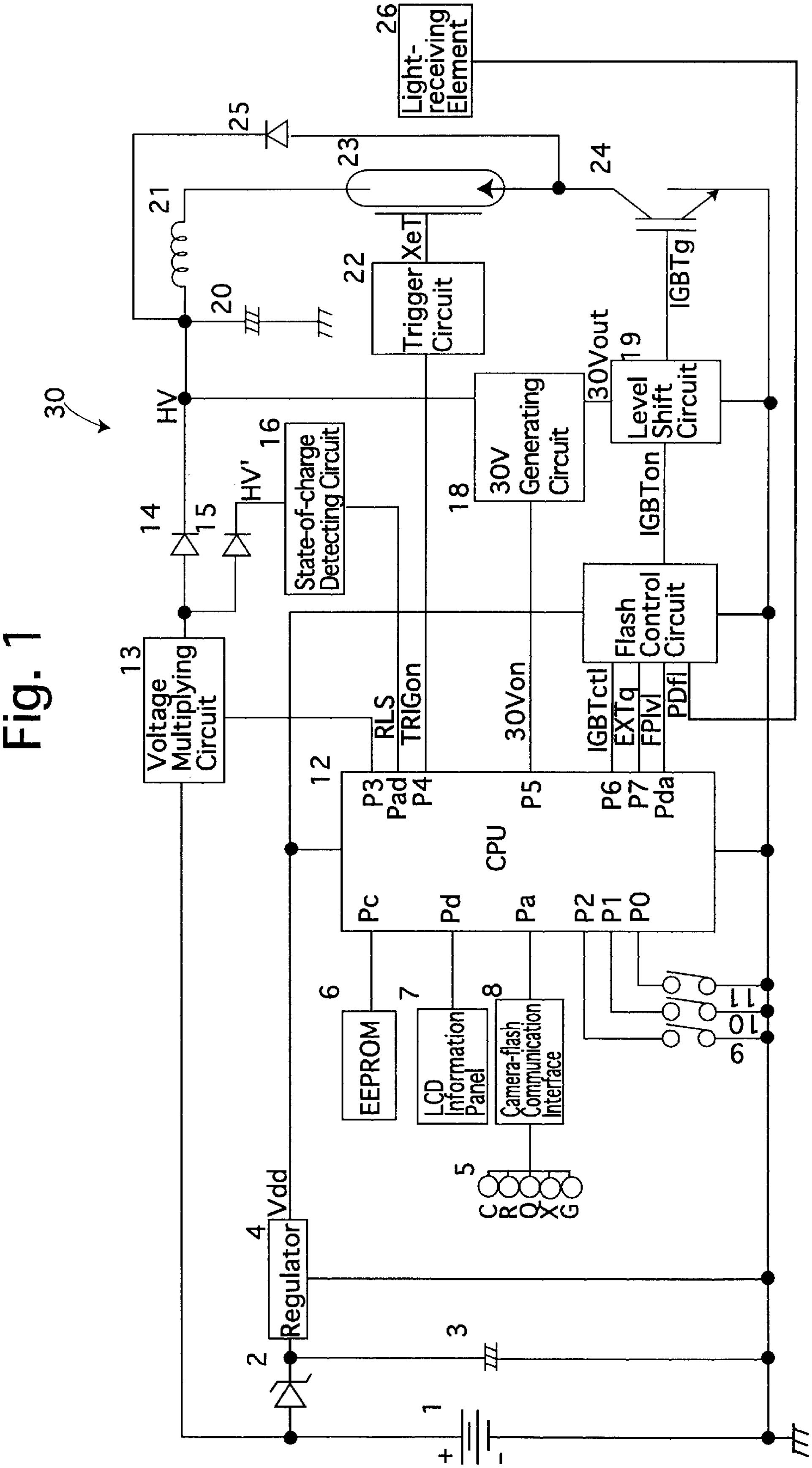
FIG. 1 is a schematic circuit diagram of an embodiment of a flash to which the present invention is applied.

FIG. 1 is a schematic circuit diagram of an embodiment of a flash (strobe) to which the present invention is applied. The flash 30 is of an external type (e.g., a flashgun or a hammer-head gun) which is connected to a camera (not shown) when in use. The flash 30 is provided with a CPU (IGBT controller) 12 which serves as a controller for comprehensively controlling the overall operations of the flash 30. The flash 30 is provided with a battery 1, a Schottky diode 2, a capacitor 3 and a regulator 4. The voltage of the battery 1 is supplied as a constant voltage Vdd to the CPU 12 via the Schottky diode 2 and the regulator 4. The voltage of the battery 1 is also supplied to the capacitor 3 via the Schottky diode 2.

The flash 30 is provided with an EEPROM 6, an LCD information panel 7 and a camera-flash communication interface 8, which are connected to the CPU 12 via ports Pc, Pb and Pa thereof, respectively. Various rewritable parameters and modes are written in the EEPROM 6. The LCD information panel 7 indicates various flash information such as various flash modes. The camera-flash communication interface 8 is used for communication between the camera and the flash.

The camera-flash communication interface 8 is provided with a terminal connector 5 which is connected to a corresponding connector (e.g., a hot shoe) of the camera. The terminal connector 5 has five terminals C, R, Q, X and G. The terminal C serves as a control terminal via which a control signal is input from the camera. The terminal R serves as a clock terminal via which a clock signal is input from the camera. The terminal Q is a dual-purpose terminal which is used for the two-way communication between the camera and the flash, and for inputting a quench signal for the flash from the camera. A signal from the X contact of the camera is input from the camera via the terminal X, in synchronization with the operation of a shutter curtain (leading curtain). The terminal G serves as a ground terminal. In a state where the flash 30 is connected to the camera via the terminal connector 5, the CPU 12 carries out data-communication with the camera via the terminals C, R and Q.

The flash 30 is provided with a light-modulation-mode selector switch 9, a sync-requirement setting switch 10 and a main switch 11, which are connected to the CPU 12 via ports P2, P1 and P0 thereof, respectively. The light-modulation-mode setting switch 9 is operated to select between a TTL automatic flash mode and a manual flash mode. The sync-requirement setting switch 10 is operated to set one of the following flash modes as sync-requirement information: a leading-curtain sync flash mode, a slave flash mode, a trailing-curtain sync flash mode, and a uniform flash-emission mode (FP emission). In the leading-curtain sync flash mode, the flash 30 starts firing upon completion of a movement of the leading curtain of the shutter. In the slave flash mode, the flash 30 starts firing at the trailing edge of the quench signal after the firing of the flash 30 set in the aforementioned leading-curtain sync flash mode starts firing. In the trailing-curtain sync flash mode, the flash 30 finishes firing until the trailing curtain of the shutter starts moving after the completion of a movement of the leading curtain of the shutter. In the uniform flash-emission mode, the flash fires with a uniform intensity for a given period of time so as to give uniform light emission on the subject.

The flash 30 is provided with a voltage step-up circuit 13 which multiplies the voltage of the battery 1, and a state-of-charge detecting circuit 16. The voltage step-up circuit 13 is connected to the CPU 12 via a port P3 thereof. The state-of-charge detecting circuit 16 is connected to the CPU 12 via an A/D conversion port Pad. The voltage multiplied by the voltage step-up circuit 13 is supplied to a main capacitor 20 via a diode 14, and also to the state-of-charge detecting circuit 16 via a diode 15 at the same time. A terminal voltage HV across the main capacitor 20 can be detected via the state-of-charge detecting circuit 16 only when the voltage step-up circuit 13 is in operation.

The flash 30 is provided with a 30-volt generating circuit 18 and a trigger circuit 22, which are connected to ports P5 and P4 of the CPU 12, respectively.

The 30-volt generating circuit 18 generates a voltage of 30 volts output from a terminal 30V out of the 30-volt generating circuit 18 with the terminal voltage HV as a power source. The voltage of 30 volts output from the 30-volt generating circuit 18 is supplied to a level shift circuit 19.

The trigger circuit 22 applies an oscillating high voltage to a trigger electrode XeT of a xenon flashtube 23 to cause xenon gas filled therein to be in an excitation state. In this excitation state, the electric charges accumulated in the main capacitor 20 are discharged via a coil 21, the xenon flashtube 23 and the IGBT 24 at the time the IGBT 24 is switched ON to thereby cause the xenon flashtube 23 to flash (emit light).

A flash control circuit (flash controller) 17 is connected to the CPU 12 via ports P6 and P7 thereof and a D/A conversion port Pda of the CPU 12. The flash control circuit 17 outputs a signal IGBTon to the level shift circuit 19 to switch the IGBT 24 ON and OFF via the level shift circuit 19 to control the intensity of the light emission of the xenon flashtube 23. The level shift circuit 19 applies the voltage of 30 volts, which is supplied from the 30-volt generating circuit 18, to a gate IGBTg of the IGBT 24 to switch the IGBT 24 ON if the signal IGBTon input from the flash control circuit 17 is "1". On the other hand, the level shift circuit 19 operates to switch the IGBT 24 OFF if the signal IGBTon input from the flash control circuit 17 is "0".

The flash control circuit 17 is connected to the regulator 4 and a light-receiving element (detecting device) 26. The light-receiving element 26 can detect the intensity of the received light thereof. The light-receiving element 26 is disposed at a position where the light-receiving element 26 can directly receive light emitted from the xenon flashtube 23. Upon a reception of the light emitted from the xenon flashtube 23, the light-receiving element 26 outputs a photocurrent responsive to the intensity (quantity) of the received light.

The general structure of the flash 30 has been described above. The flash control circuit 17, the 30-volt generating circuit 18 and the state-of-charge detecting circuit 16 will be hereinafter discussed in detail with reference to FIGS. 2, 3 and 4.

Figure 2:
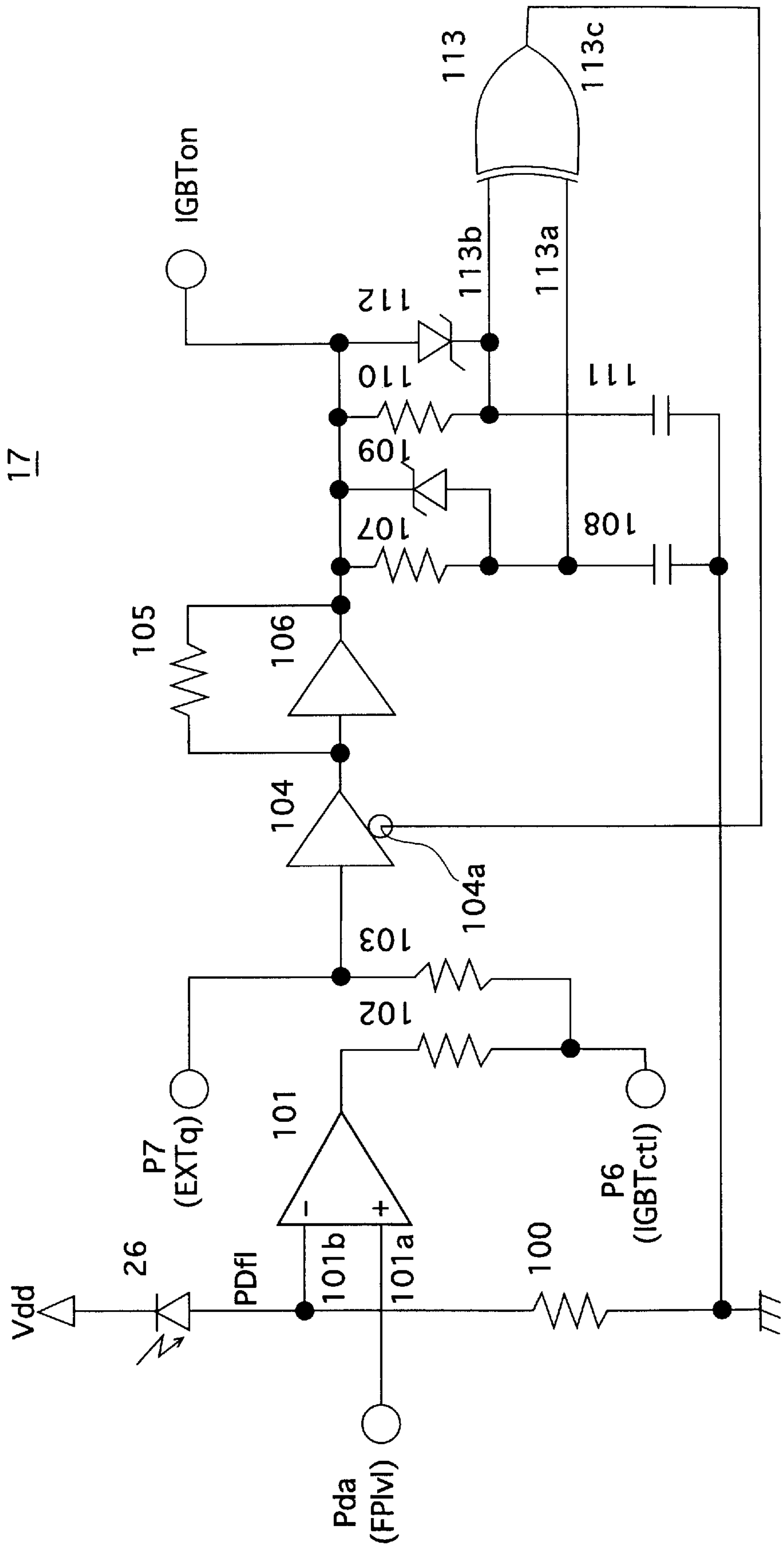
FIG. 2 is a schematic circuit diagram of an embodiment of a flash control circuit shown in FIG. 1.

FIG. 2 is a schematic circuit diagram of an embodiment of the flash control circuit 17. The D/A conversion port Pda of the CPU 12 is connected to a non-inverting input terminal 101*a* of a comparator 101. A voltage FP1*v*1 which is output from the D/A conversion port Pda of the CPU 12 is input to the non-inverting input terminal 101*a*. An inverting input terminal 101*b* of the comparator 101 is connected to a junction between the light-receiving element 26 and a resistor 100. The cathode of the light-receiving element 26 is connected to a power line Vdd supplied from the regulator 4. A voltage PDf1 which is the voltage at the junction between the light-receiving element 26 and the resistor 100 and which corresponds to the intensity of light emitted by the xenon flashtube 23 is input to the inverting input terminal 101*b* of the comparator 101. The comparator 101 compares the voltage FP1*v*1 with the voltage PDf1, and outputs a level signal (a low-level signal "0", or a high-level signal "1") in accordance with the result of the comparison.

The output terminal of the comparator 101 is connected to the port P6 of the CPU 12 via a resistor 102, and is further connected to the input terminal of a bus buffer (switching device) 104 and the port P7 of the CPU 12 via the resistor 102 and a resistor 103. The port P7 (EXTq) of the CPU 12 is connected to the input terminal of the bus buffer 104.

The output terminal of the bus buffer 104 is connected to the input terminal of a buffer 106. A resistor 105 is connected between the input and output terminals of the buffer 106. The output of the buffer 106 is fed back to the input thereof via the resistor 105, and also is output as the aforementioned signal IGBTon to the level shift circuit 19.

The bus buffer 104 is provided with a control terminal 104*a*. When the signal input to the control terminal 104*a* is "1", the output of the buffer 106 is maintained, so that the signal IGBTon does not vary. Namely, when the signal input to the control terminal 104*a* is "1", the output of the bus buffer 104 does not vary regardless of the signal input thereto, so that the IGBT 24 cannot be switched ON or OFF. On the other hand, when the signal input to the control terminal 104*a* is "0", the output of the bus buffer 104 varies, so that the signal IGBTon varies to thereby make it possible for the IGBT 24 to be switched ON or OFF.

The resistor 105 and the buffer 106 function as a latch circuit. The bus buffer 104 functions as a switching circuit which connects and disconnects the aforementioned latch circuit to and from the comparator 101. In the following descriptions, a state of the bus buffer 104 when the signal input to the control terminal 104*a* of the bus buffer 104 is "1" is referred to as an OFF state of the bus buffer 104, while the other state of the bus buffer 104 when the signal input to the control terminal 104*a* of the bus buffer 104 is "0" is referred to as an ON state of the bus buffer 104.

The control terminal 104*a* of the bus buffer 104 is connected to an output terminal 113*c* of an XOR (exclusive OR) gate 113. The XOR gate 113 is provided with two input terminals 113*a* and 113*b*. The input terminal 113*a* is connected to a line connecting a resistor 107 with a capacitor 108. The resistor 107 and the capacitor 108 constitute an RC circuit and are connected in series between the output terminal of the buffer 106 and ground. The input terminal 113*a* is also connected to an anode of a Schottky diode 109. The other input terminal 113*b* of the XOR gate 113 is connected to a line connecting a resistor 110 with a capacitor 111. The resistor 110 and the capacitor 111 are connected in series between the output terminal of the buffer 106 and ground. The input terminal 113*b* is also connected to a cathode of a Schottky diode 112.

Variation of the output of the XOR gate 113 will be hereinafter discussed. If the output of the buffer 106 changes from "0" to "1", the output of the XOR gate 113 is "1" from the moment the output of the buffer 106 changes until a time constant $\tau a$ determined by the resistor 107 and the capacitor 108 elapses. Once the time constant $\tau a$ elapses, the output of the XOR gate 113 becomes "0". Conversely, if the output of the buffer 106 changes from "1" to "0", the output of the XOR gate 113 is "0" from the moment the output of the buffer 106 changes until a time constant $\tau b$ determined by the resistor 110 and the capacitor 111 elapses. Once the time constant $\tau b$ elapses, the output of the XOR gate 113 becomes "1". Accordingly, if the output of the buffer 106 changes, the bus buffer 104 is maintained in the OFF state from the moment of the change until the time constant $\tau a$ or $\tau b$ elapses. Thereafter, the OFF state of the bus buffer 104 is changed to the ON state upon a lapse of the time constant $\tau a$ or $\tau b$.

Figure 3:
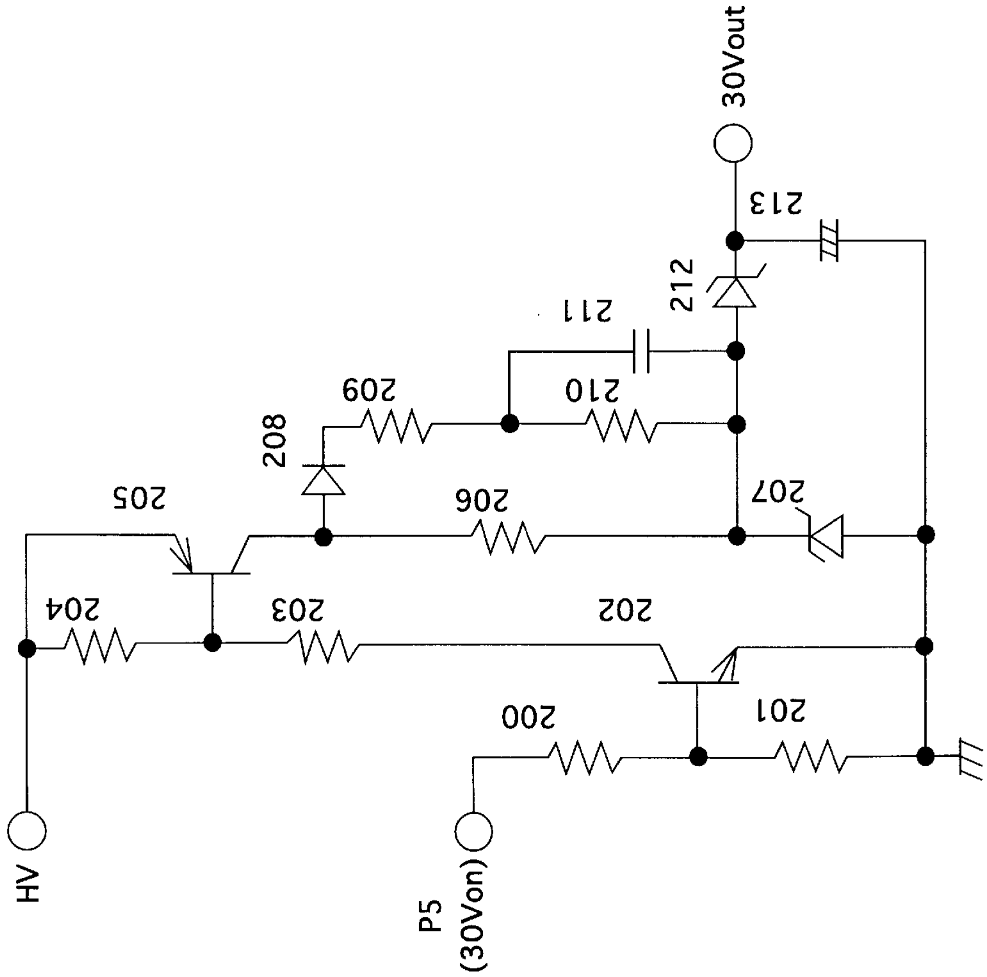
FIG. 3 is a schematic circuit diagram of an embodiment of a 30-volt generating circuit shown in FIG. 1.

FIG. 3 is a schematic circuit diagram of an embodiment of the 30-volt generating circuit 18. The 30-volt generating circuit 18 is provided with two high-voltage-resistance transistors 202 and 205 each of which is OFF in a state where the 30-volt generating circuit 18 inputs the signal 30Von "0" from the port P5 of the CPU 12. Therefore, in this state no current flows into the 30-volt generating circuit 18 from the line of the terminal voltage HV, and therefore nothing is output from the terminal 30Vout.

On the other hand, in a state where the 30-volt generating circuit 18 inputs the signal 30Von "1" from the port P5 of the CPU 12, the high-voltage-resistance transistor 202 is switched ON, which causes the high-voltage-resistance transistor 205 to be switched ON. Upon the high-voltage-resistance transistor 205 being switched ON, a current flows from the line of the terminal voltage HV to a capacitor 213 via a diode 208, a resistor 209, a capacitor 211 and a Schottky diode 212 to charge the capacitor 213 quickly. The terminal voltage across the capacitor 213 is limited to a voltage equal to or smaller than 30 volts by a 30V Zener diode 207, and is output from the terminal 30Vout of the 30-volt generating circuit 18. If the capacitor 211 is fully charged, a current flows via the resistor 206 and the Schottky diode 212 to thereby maintain the voltage of 30 volts output from the terminal 30Vout.

Figure 4:
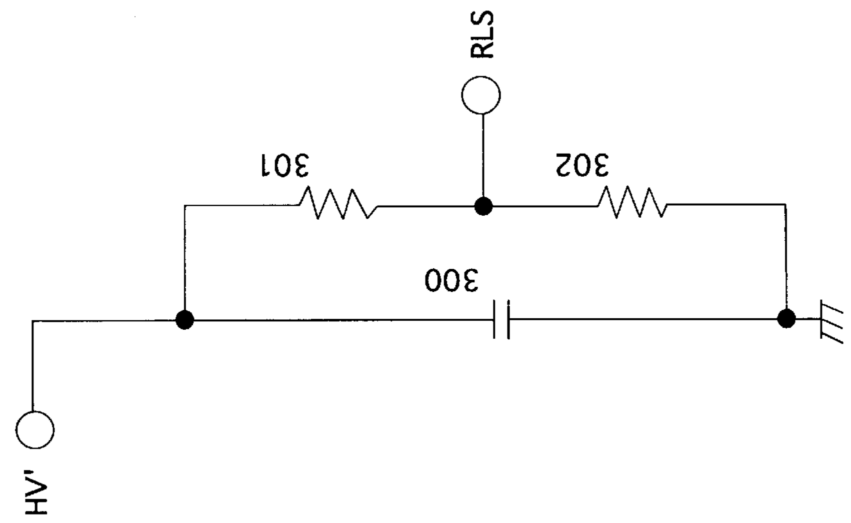
FIG. 4 is a schematic circuit diagram of an embodiment of a state-of-charge detecting in FIG. 1.

FIG. 4 is a schematic circuit diagram of an embodiment of the state-of-charge detecting circuit 16. The state-of-charge detecting circuit 16 inputs a voltage HV' which is equal to the voltage HV of the terminal voltage HV across the main capacitor 20 immediately after the voltage step-up circuit 13 starts to step up the voltage of the battery 1. The voltage HV' is firstly rectified via a capacitor 300, and is subsequently divided via resistors 301 and 302 to be output from the state-of-charge detecting circuit 16. For instance, if the ratio of the resistance value of the resistor 301 to the resistance value of the resistor 302 is set at 99 to 1, an output voltage RLS of the state-of-charge detecting circuit 16 is 3.3 volts and 2.7 volts when the input voltage HV' is 330 volts and 270 volts, respectively. The input voltage HV' is generated only when the voltage step-up circuit 13 is in operation. Therefore, the terminal voltage HV across the main capacitor 20 can be detected only when the voltage step-up circuit 13 is in operation.

In the present embodiment, a current is prevented from flowing into the state-of-charge detecting circuit 16 from the main capacitor 20 by the diode 14 when the voltage step-up circuit 13 is not in operation. Namely, the main capacitor 20 is under a no-load state when the voltage step-up circuit 13 is not in operation. This makes it possible to prevent the main capacitor 20 from discharging superfluously.

Based on the structures of fundamental elements of the flash 30 which have been described above with reference to FIGS. 1 through 4, a brief description of the uniform flash-emission control will be hereinafter discussed with reference to time charts shown in FIGS. 5 and 6.

Figure 5:
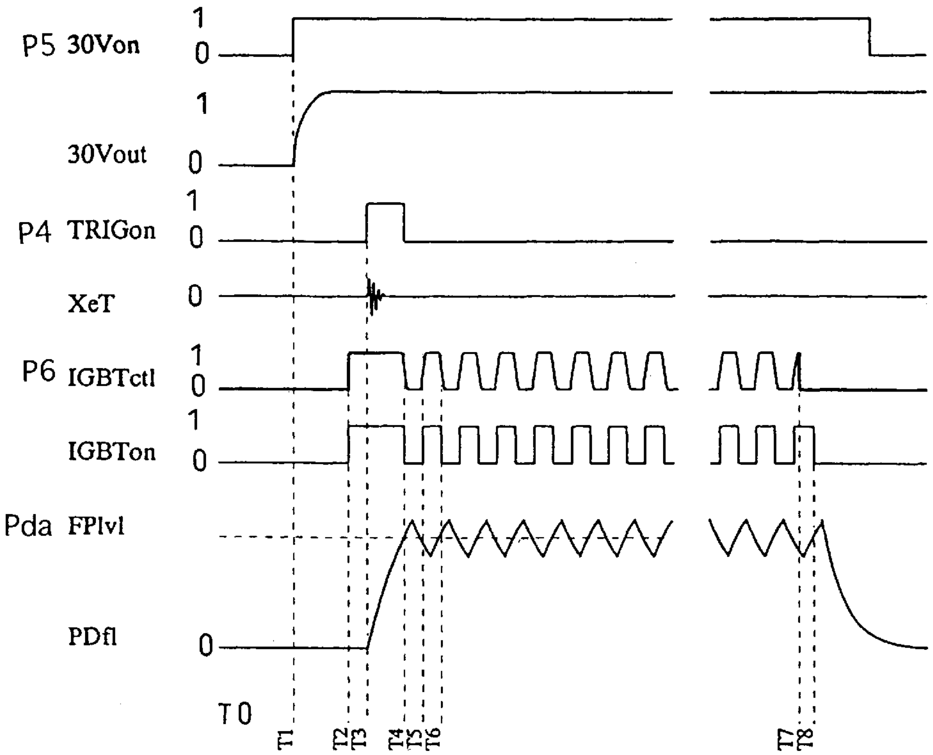
FIG. 5 is a time chart of a uniform flash-emission control, according to the present invention.

FIG. 5 is a time chart for the uniform flash-emission control. In FIG. 5, a time t0 corresponds to the initial state of the flash 30. In the initial state, the ports P4, P5 and P6, from which a signal TRIGon, the aforementioned signal 30Von and a signal IGBTct1 are respectively output, are set to "0". The port P7 of the CPU 12 is set as an input port. The D/A conversion port Pda of the CPU 12 outputs the voltage FP1*v*1. Since the aforementioned signal TRIGon is "0" at the time t0, the xenon flashtube 23 does not emit light, so that the light-receiving element 26 does not output any photocurrent. Therefore, the voltage PDf1, which is input to the inverting input terminal 101*b* of the comparator 101, is "0" while the output of the comparator 101 is "1". In this state, since the signal IGBTct1 is "0", each of the output and the input of the bus buffer 104 is "0". Accordingly, the signal IGBTon, which is the output of the bus buffer 106, is "0".

In the initial state, the CPU 12 changes the signal 30Von from "0" to "1" at a time T1. This causes the 30-volt generating circuit 18 to generate a voltage of 30 volts and output from the terminal 30Vout.

Immediately after the voltage of 30 volts generated by the 30-volt generating circuit 18 becomes stable (time T2), the CPU 12 changes the signal IGBTct1 from "0" to "1". This causes the input of the bus buffer 104 to become "1", so that the signal IGBTon becomes "1". As a result, the level shift circuit 19 applies the voltage of 30 volts given from the 30-volt generating circuit 18 to the gate IGBTg of the IGBT 24 to switch the IGBT 24 ON.

If the aforementioned signal IGBTon changes from "0" to "1", the input terminal 113*b* of the XOR gate 113 becomes "1" instantly because the capacitor 111 is charged quickly via the Schottky diode 112 of the flash control circuit 17. In contrast to this, the other input terminal 113*a* of the XOR gate 113 becomes "1" upon a lapse of the time constant τa determined by the resistor 107 and the capacitor 108 because the capacitor 108 is charged via the resistor 107. Therefore, the output of the XOR gate 113 is "1" while the bus buffer 104 is in the OFF state from the moment the signal IGBTon changes from "0" to "1" until the time constant τa elapses. The IGBT 24 is maintained ON during the time the bus buffer 104 is in the OFF state because each of the input and the output of the buffer 106 is maintained at "1" during that time.

When a predetermined period of time elapses (time T3) since the IGBT 24 was switched ON, the CPU 12 changes a signal TRIGon from "0" to "1". Upon this change of the signal TRIGon, the trigger circuit 22 applies an oscillating high voltage to the trigger electrode XeT of the xenon flashtube 23. Since the IGBT 24 has been already switched ON at this time, the electric charges accumulated in the main capacitor 20 are discharged via the coil 21, the xenon flashtube 23 and the IGBT 24, i.e., the xenon flashtube 23 starts emitting light. Consequently, the voltage PDf1, which is input to the inverting input terminal 101*b* of the comparator 101, increases rapidly to correspond to the intensity of the light emission of the xenon flashtube 23.

Thereafter, the CPU 12 sets the port P6 as an input port, and changes the signal TRIGon from "1" to "0". This causes the comparator 101 to enter a state equivalent to a state where the port p6 of the CPU 12 is disconnected from the flash control circuit 17. In this state, a signal as the signal IGBTct1 is output from the comparator 101. At this time, the output of the comparator 101 is still "1", while the signal IGBTct1 is maintained at "1".

If the voltage PDf1, which is input to the inverting input terminal 101*b* of the comparator 101 of the flash control circuit 17, becomes greater than the voltage FP1*v*1 (time T4), the signal IGBTct1 becomes "0", and also the signal IGBTon becomes "0". This causes the level shift circuit 19 to stop applying the voltage of 30 volts given from the 30-volt generating circuit 18 to the gate IGBTg of the IGBT 24 to switch the IGBT 24 OFF. Immediately after the IGBT 24 is switched OFF, the discharge of the electric charges in the main capacitor 20 via the IGBT 24 stops, while the energy accumulated in the coil 21 (due to the current which has flown into the coil 21 when the xenon flashtube 23 emits light) is discharged via the xenon flashtube 23 and the diode 25. Consequently, the intensity of the light emission of the xenon flashtube 23 decreases.

If the aforementioned signal IGBTon changes from "1" to "0", the capacitor 108 of the flash control circuit 17 discharges quickly via the Schottky diode 109. As a result, the input terminal 113*a* of the XOR gate 113 becomes "0" instantly. In contrast to this, the other input terminal 113*b* of the XOR gate 113 becomes "0" upon a lapse of the time constant τb which is determined by the resistor 110 and the capacitor 111 because the capacitor 111 discharges via the resistor 110. Therefore, the output terminal 113*c* of the XOR gate 113 is "1" from the moment the signal IGBTon changes from "1" to "0" until the time constant τb elapses. Namely, the bus buffer 104 is in the OFF state. The IGBT 24 is maintained OFF during the time the bus buffer 104 is in the OFF state because each of the input and the output of the buffer 106 is maintained at "0" during that time.

If the intensity of the light emission of the xenon flashtube 23 decreases and accordingly the voltage PDf1, which is input to the flash control circuit 17 becomes smaller than the voltage FP1*v*1 (time T5), the output of the comparator 101 of the flash control circuit 17 becomes "1", again, and also the signal IGBTon becomes "1" to switch the IGBT 24 ON. This causes the energy accumulated in the main capacitor 20 to be discharged via the coil 21, the xenon flashtube 23 and the IGBT 24 to thereby increase the intensity of the light emission of the xenon tube 23. It should be noted that at the time T5 the trigger circuit 22 does not need to apply an oscillating high voltage to the trigger electrode XeT of the xenon flashtube 23 because the excitation state of the xenon gas filled in the xenon flashtube 23 is still maintained.

If the IGBT 24 is again switched ON to thereby increase the intensity of the light emission of the xenon tube 23 and accordingly the voltage PDf1, which is input to the flash control circuit 17, becomes greater than the voltage FP1*v*1 (time T6), the output of the comparator 101 of the flash control circuit 17 becomes "0" again, and also the signal IGBTon becomes "0" to switch the IGBT 24 OFF. This causes the energy accumulated in the coil 21 to be discharged via the xenon flashtube 23 and the diode 25. Consequently, the intensity of the light emission of the xenon flashtube 23 decreases.

The flash 30 illuminates the object (subject) while maintaining light emission (uniform flash-emission) with little fluctuation in intensity by repeating the aforementioned operations at the times T5 and T6.

Upon a lapse of a predetermined period of time for the light emission with uniform intensity (time T7), the CPU 12 outputs a light-emission stop signal. Namely, the signal IGBTct1 is set to "0". At this time, if the output of the comparator 101 of the flash control circuit 17 is "0", the IGBT 24 is in the OFF state, so that the uniform flash-emitting operation is stopped. Conversely, if the output of the comparator 101 is "1", the bus buffer 104 is in the OFF state from the moment the signal IGBTon changes from "0" to "1" until the time constant τa elapses. Therefore, upon this lapse of the time constant τa, the OFF state of the bus buffer 104 changes to the ON state, so that the signal IGBTon is transmitted while the IGBT 24 is switched OFF (time T8).

Figures 6A, 6B, 6C:
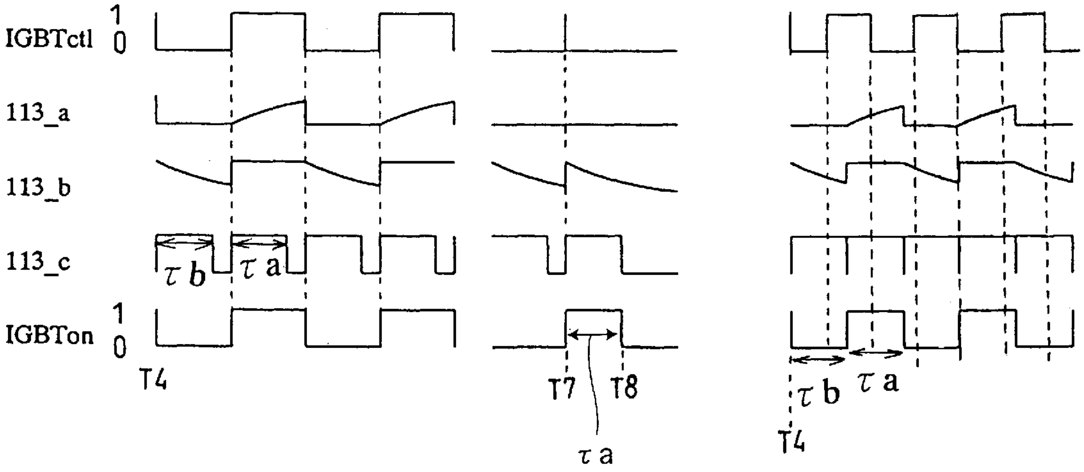
FIG. 6A is a time chart of the uniform flash-emission control, showing the case where the cycle period of a signal IGBTct1 is longer than each of time constants $\tau a$ and $\tau b$.
FIG. 6B is another time chart of the uniform flash-emission control, showing the case where the cycle period of the signal IGBTct1 is shorter than each of the time constants $\tau a$ and $\tau b$.
FIG. 6C is another time chart of the uniform flash-emission control, according to the present invention.

FIGS. 6A and 6B are enlarged time charts for the uniform flash-emission control from the time T4 to the time T8. FIG. 6A shows the case where the cycle period of the signal IGBTct1 is longer than each of the time constants τa and τb. FIG. 6B shows the case where the cycle period of the signal IGBTct1 is shorter than each of the time constants τa and τb.

The cycle period of the signal IGBTct1 depends on the resistance of the xenon flashtube 23 at the time of the light emission thereof, the impedance of the coil 21, the voltage on the main capacitor 20, and the response delay times of the comparator 101 and the IGBT 24.

As shown in FIG. 6A, when the cycle period of the signal IGBTct1 is longer than each of the time constants τa and τb, the output terminal 113*c* of the XOR gate 113 has already become "0" in either of two cases when the signal IGBTct1 changes from "1" to "0" after having changed from "0" to "1" and when the signal IGBTct1 changes from "0" to "1" after having changed from "1" to "0". Namely, when the cycle period of the signal IGBTct1 is longer than each of the time constants τa and τb, the bus buffer 104 is in the ON state in either of these two cases. Therefore, the variations of the leading and trailing edges of the signal IGBTct1 between are transmitted to the buffer 106 at once so that the waveform of the signal IGBTct1 becomes identical to the waveform of the signal IGBTon.

On the other hand, as shown in FIG. 6C, when the cycle period of the signal IGBTct1 is shorter than each of the time constants τa and τb, the output terminal 113*c* of the XOR gate 113 is still "1" in either of two cases when the signal IGBTct1 changes from "1" to "0" after having changed from "0" to "1" and when the signal IGBTct1 changes from "0" to "1" after having changed from "1" to "0". Therefore, the variations of the leading and trailing edges of the signal IGBTct1 are interrupted by the bus buffer 104, and are therefore not transmitted to the buffer 106 until each of the time constants τa and τb elapses. Namely, the signal IGBTon shifts in time from the signal IGBTct1 step by step in increments of the difference between the cycle period of the signal IGBTct1 and the sum of the time constants τa and τb. Accordingly, the cycle period of the signal IGBTct1 does not become shorter than each of the time constants τa and τb.

In the present embodiment, the time constants τa and τb are determined to correspond to the maximum operable frequency of the IGBT. Therefore, the control frequency for the IGBT 24 never exceeds the maximum operable frequency thereof. Consequently, the IGBT 24 is prevented from being damaged even during the uniform flash-emitting operation. Furthermore, the full performance of the IGBT 24 can be exploited because the IGBT 24 is switched ON and OFF repetitively at a frequency in the close vicinity of the maximum operable frequency. Note that the time constant τa corresponds to the duration of an ON state of the IGBT 24, and the time constant τb corresponds to the duration of an OFF state of the IGBT 24.

FIG. 6B is an enlarged time chart for the uniform flash-emission control from the time T7 to the time T8. At time T7, the signal IGBTct1 of "0" is output from the port P6 of the CPU 12 immediately after the output of the comparator 101 changes from "0" to "1". The bus buffer 104 remains in the OFF state from the moment the signal IGBTon changes from "0" to "1" until the time constant τa elapses. Therefore, even if the signal IGBTct1 of "0" is output from the port P6 of the CPU 12, the signal IGBTon is maintained at "1" while the IGBT 24 remains ON. Thereafter, upon a lapse of the time constant τa, the OFF state of the bus buffer 104 changes to the ON state, so that the signal IGBTon changes from "1" to "0" while the IGBT 24 is switched OFF. Accordingly, in the present embodiment of the flash 30, the IGBT 24 is not switched ON or OFF compulsively in the middle of the transition thereof from OFF to ON or from ON to OFF, respectively, before a certain period of time elapses from the time of a variation of the IGBTct1 because the state of the IGBT 24 is maintained for the certain period of time from the time of a variation thereof. Therefore, the IGBT 24 is prevented from being damaged even when the uniform flash-emitting operation is stopped.

Operations of the flash 30 will be hereinafter discussed in detail with reference to flow charts shown in FIGS. 9 through 13. The processes represented by the flow charts shown in FIGS. 9 through 13 are performed by the CPU 12 in accordance with the programs written in internal ROM of the CPU 12.

[Main Process]

Figure 9:
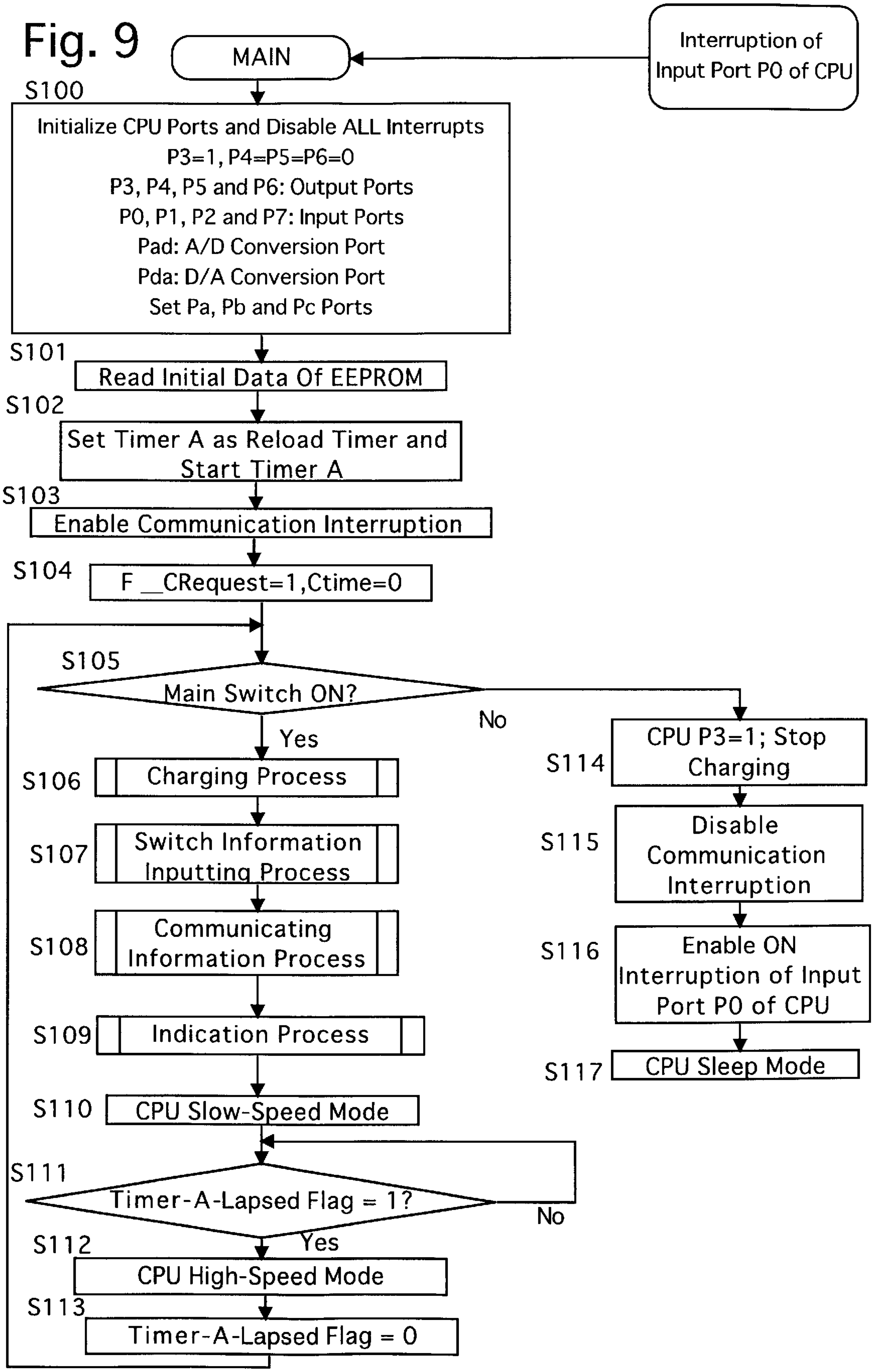
FIG. 9 is a flow chart of an embodiment of a main process regarding fundamental operations of the flash shown in FIG. 1.

FIG. 9 is a flow chart for a main process of the flash 30. Immediately after a battery 1 is loaded in the flash 30, the CPU 12 is reset to its initial state, and thereafter control enters the main process.

In the main process, firstly all interrupts are disabled, and all ports such as input ports, output ports and conversion ports are initialized (step S100). Thereafter, the CPU 12 communicates with the EEPROM 6 via the port Pc to read initial data of the EEPROM 6 (step S101). A timer A (not shown) is set as a reload timer and started (step S102). Thereafter, communication interruption from the camera is enabled (step S103). Subsequently, an F_C Request flag is set to 1, while a variable Ctime for control of the charging time of the main capacitor 20 is set to 0 (step S104). The F_C Request flag is set to 1 when the main capacitor 20 needs to be charged until the voltage thereof reaches a predetermined maximum charge voltage Vmax of the main capacitor 20.

Subsequently, it is determined whether the main switch 11 is ON (step S105). If the main switch 11 is OFF (if "NO" at step S105), the output port P3 is set to "1" to stop the operation of the voltage step-up circuit 13 (step S114), communication interruption from the camera is disabled (step S115), an ON interruption of the input port P0 is enabled (step S116), and the CPU 12 enters a sleep mode (power save mode) (step S117). In the sleep mode, since the ON-interruption of the input port P0 is enabled, an interrupt occurs upon the main switch 11 being turned ON, so that control returns to the operation at step S100 to start performing the main process.

If it is determined at step S105 that the main switch 11 is ON, a charging process ("Charging Process" shown in FIGS. 10A and 10B) for charging the main capacitor 20 is performed (step S106), and subsequently, a switch information inputting process in which switch information determined by the operations of the light-modulation-mode setting switch 9 and the sync-requirement setting switch 10 are input to the CPU 12 is performed (step S107).

Thereafter, a communicating information process is performed (step S108). In this process, firstly C-F (from camera to flash) communication information shown in Table 2 below which is to be transmitted from the camera to the flash is input from the camera. Subsequently, various modes are set in accordance with the C-F communication information input from the camera, and F-C (from flash to camera) communication information shown in Table 1 on the set various information is output to the camera.

After the communicating information process is performed at step S108, an indication process wherein the LCD information panel 7 is driven to indicate flash information is performed (step S109). The flash information includes information on the aforementioned TTL automatic flash mode or manual flash mode which is selected by an operation of the light-modulation-mode setting switch 9, information on the aforementioned sync-requirement information set by an operation of the sync-requirement setting switch 10, recharging completion information, angle-of-view invalid information, light-modulation confirmation information, light-modulation-mode designation information designated by the camera, sync-mode designation information, and information on flash coverage for the focal length of photographing lens, the longest light-modulation distance and the shortest light-modulation distance.

After the indication process at step S109 is performed, the CPU 12 enters a CPU slow-speed mode to reduce power consumption (step S110), and it is determined whether a timer-A-lapsed flag is 1 (step S111). If the timer-A-lapsed flag is 0 (if "NO" at step S111), control repeats the operation at step S111 until the timer-A-lapsed flag becomes 1. The timer-A-lapsed flag is set to 1 upon expiration of the timer A. If is determined at step S111 that the timer-A-lapsed flag is 1 (if "YES" at step S111), the CPU 12 enters a CPU high-speed mode (step S112), subsequently the timer-A-lapsed flag is set to 0, and control returns to step S105. Accordingly, the timer A restarts every time the interval preset in the timer A expires, and the aforementioned operations from step S105 to step S113 are performed once every 125 ms if the main switch 11 is in the ON state.

Table 1 below shows an embodiment of the F-C communication information which is transmitted from the flash 30 to camera.

TABLE 1

| No. | Information Name | Information Content |
|---|---|---|
| 1 | Recharging Completion Signal | Charge |
| 2 | Sync Requirement | Leading Curtain/Trailing Curtain/FP |
| 3 | Gno | Gv |
| 4 | Other | Angle-of View Invalid/ Light-Modulation Confirmation |

A flag "Charge" for determining whether the main capacitor 20 has finished being charged is set as "Recharging Completion Signal" information. The leading-curtain sync flash mode, the slave flash mode, the trailing-curtain sync flash mode, or the uniform flash-emission (FP) mode which is set via the sync-requirement setting switch 10 is set in the "Sync Requirement" information. Guide number value Gv of a guide number Gno corresponding to the cover angle of view of the flash 30 is set as "Gno" information. The "Angle-of View invalid" information is set if the current cover angle of view of the flash is greater than the angle of view of the photographing lens represented by the currently-input information on the focal length of the photographing lens, as a result of a comparison of the former angle of view with the current angle of view. The "Light-Modulation Confirmation" information is set when the light-emission stop signal is input from the camera at the light emission of the flash.

Table 2 below shows an embodiment of the C-F communication information which is transmitted from the camera to the flash 30.

TABLE 2

| No. | Information Name | Information Content |
|---|---|---|
| 5 | Light Modulation Mode Designation | TTL/Manual/NA |
| 6 | Sync Designation | Leading Curtain/Trailing Curtain/FP |
| 7 | Lens Focal Length | 20/24/28/35/50/70/85 |
| 8 | Pre-Flash Command | Pre |
| 9 | Duration of Uniform-Intensity Flashlight | Tfp |
| 10 | Flashlight Intensity Multiplying Factor | Mv |
| 11 | Longest Light-Modulation Distance | Dvmax |

The "Light Modulation Mode Designation" information is set to designate one of the following modes: a TTL automatic flash mode, a manual flash mode and a NA mode.

One of these modes designated by the "Light Modulation Mode Designation" information takes precedence over the mode (the TTL automatic flash mode or the manual flash mode) selected by the light-modulation-mode setting switch 9. For instance, in the case where the "Light Modulation Mode Designation" information designates the TTL automatic flash mode, the CPU 12 sets the TTL automatic flash mode even if the manual flash mode is selected by the light-modulation-mode setting switch 9. However, if the "Light Modulation Mode Designation" information designates the NA mode, the mode (the TTL automatic flash mode or the manual flash mode) selected by the light-modulation-mode setting switch 9 is set.

The "Sync Designation" information takes precedence over the "Sync Requirement" information shown in Table 1 because the camera determines an appropriate mode and communicates with the flash 30 in the case where a plurality of flashes are connected to the camera.

A flag "Pre" for determining whether a pre-flash operation is to be performed is set as the "Pre-Flash Command" information.

A flash intensity multiplying factor Mv is set as the "Flashlight Intensity Multiplying Factor" information.

A longest light-modulation distance Dvmax which is calculated from an equation "Dvmax=Gv−Av+Sv−5" as the "Longest Light-Modulation Distance" information. If a shortest light-modulation distance which is calculated from an equation "Dvmax−6" is smaller than a prescribed value, e.g. 0.7 m (Dv=−1), the prescribed value is set as the shortest distance. Note that "Dv", "Gv", "Av" and "Sv" represent the distance value, the guide number value, the aperture value and the speed value of the APEX system, respectively.

[Charging Process]

The charging process that is performed at step S106 in the main process will be hereinafter discussed in detail with reference to the flow chart shown in FIGS. 10A and 10B.

Firstly, a process which is performed from the time the main capacitor 20 starts being charged to the time the voltage (A/D converted value) on the main capacitor 20 reaches a predetermined minimum charge voltage Vmin thereof will be hereinafter discussed. In the charging process, it is determined whether the F_C Request flag is 1 (step S200). The F_C Request flag is set to 1 when the main capacitor 20 needs to be charged until the voltage thereof reaches the maximum charge voltage Vmax of the main capacitor 20.

If the F_C Request flag is 1 (if "YES" at step S200), the output port P3 is set to "0", while the voltage step-up circuit 13 is driven to start charging the main capacitor 20 (step S205). Upon the commencement of charging of the main capacitor 20, a timer Ptime is reset to 0 while a F_onc flag is set to 1 (step S206). The timer Ptime measures an elapsed time from the moment the voltage on the main capacitor 20 reaches the maximum charge voltage Vmax. The F_onc flag is set to 1 when the main capacitor 20 is charged.

Subsequently, the output voltage RLS of the state-of-charge detecting circuit 16 is input via the A/D conversion port Pad (step S207), and it is determined whether the A/D converted value of the output voltage RLS is greater than the minimum charge voltage Vmin (step S208). If the A/D converted value of the output voltage RLS has not yet reached the minimum charge voltage Vmin (if "NO" at step S208), the flag "Charge" that serves as "Recharging Completion Signal" information is set to "0" while the F_C Request flag remains at "1" (step S210). Subsequently, control returns to the main process. On the other hand, if the A/D converted value of the output voltage RLS has reached the minimum charge voltage Vmin (if "YES" at step S208), the flag "Charge" is set to 1 (step S209), and subsequently it is determined whether the A/D converted value of the output voltage RLS is greater than the maximum charge voltage Vmax (step S211).

In the present embodiment of the flash 30, the maximum charge voltage Vmax and the minimum charge voltage Vmin are predetermined to be 330 volts and 270 volts, respectively, and the ratio between the resistance values of the resistors 301 and 302 is 99 to 1. Therefore, the minimum charge voltage Vmin is 2.7 volts, and the maximum charge voltage Vmax is 3.3 volts. Accordingly, performing the operation at step S208 is equivalent to determining whether the voltage on the main capacitor 20 is greater than 270 volts. Likewise, performing the operation at step S211 is equivalent to determining whether the voltage on the main capacitor 20 is greater than 330 volts. The minimum charge voltage Vmin and the maximum charge voltage Vmax can be set as initial data stored in the EEPROM 6.

The operations in the case where the voltage (A/D converted value) on the main capacitor 20 is greater than the minimum charge voltage Vmin and smaller than the maximum charge voltage Vmax will be hereinafter discussed.

If it is determined at step S211 whether the A/D converted value of the output voltage RLS is smaller than the maximum charge voltage Vmax (if "NO" at step S211), it is determined whether the variable Ctime is 0 (step S212-1). The charging process shown in FIGS. 10A and 10B is performed once every 125 ms, so that the variable Ctime serves as a time resistor which is increased by one each time 125 ms elapses.

If the variable Ctime is 0 (if "YES" at step S212-1), the A/D converted value of the output voltage RLS is stored in memory as an A/D old value (step S212-2), and subsequently control proceeds to step S212-3. On the other hand, if the variable Ctime is 1 (if "NO" at step S212-1), control skips the operation at step S212-2, and proceeds to step S212-3. At step S212-3, the variable Ctime is incremented by one. Subsequently, it is determined whether the variable Ctime is greater than 16, i.e., whether two seconds has elapsed since the voltage of the main capacitor 20 exceeded the minimum charge voltage Vmin (step S213). If the variable Ctime is greater than 16 (if "YES" at step S213), the variable Ctime is cleared, i.e., set to 0 (step S214), and subsequently it is determined whether the A/D converted value of the output voltage RLS is greater than the sum of the A/D old value (which has been stored in memory two seconds ago) and a prescribed value Kh (step S215) for the purpose of checking the rate of climb (R/C) of the voltage on the main capacitor 20.

Figure 14:
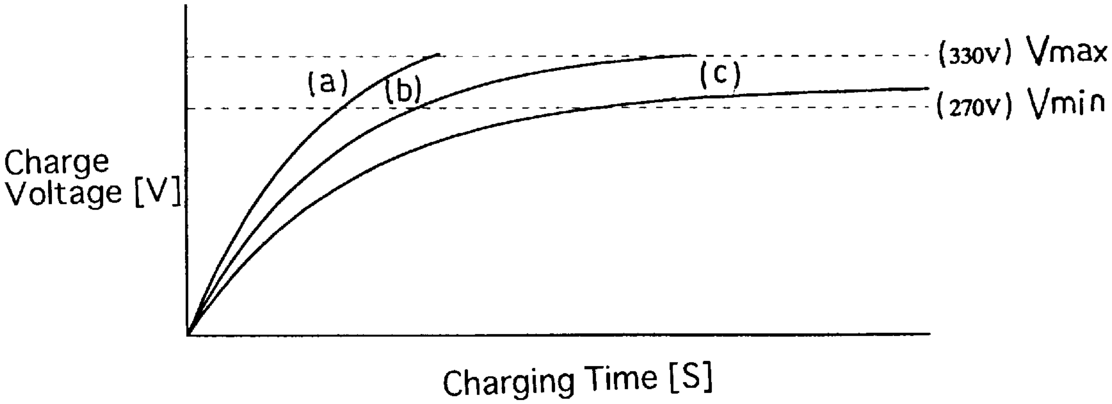
FIG. 14 is a graph showing a relationship between the voltage on a typical rechargeable battery and the recharging time thereof.

FIG. 14 is a graph showing a relationship between the voltage on a typical capacitor and the charging time thereof. In the graph, lines (a), (b) and (c) respectively show three different cases where three batteries whose degree of battery drain are different from one another are used to charge the capacitor. More specifically, line (a) shows the case where a battery whose degree of battery drain is minimum among all the three batteries used, while line (c) shows the case where a battery whose degree of battery drain is maximum among all the three batteries used. In the case of line (c), the voltage on the capacitor never reaches the maximum charge voltage Vmax even if the capacitor is charged for a long period of time. In this case, from the viewpoint of charge efficiency, it is not preferable that the capacitor keep being charged until the voltage on the capacitor reaches the maximum charge voltage Vmax. To prevent this from occurring, according to the present embodiment of the flash, if the voltage on the main capacitor 20 has reached the maximum charge voltage Vmin, the main capacitor 20 stops charging on condition that the rate of climb (R/C) of the voltage on the main capacitor 20 is lower than the prescribed value Kh. For instance, if the prescribed value Kh is set at 20 mV, the main capacitor 20 stops charging if the terminal voltage HV thereof does not rise 2 volts or more in two seconds. In FIG. 14, the rate of climb (R/C) of the voltage on the capacitor is 60 volts/sec., 30 volts/sec. and 1 volt/sec. for lines (a), (b) and (c), respectively.

If it is determined that the A/D converted value of the output voltage RLS is not greater than the sum of the A/D old value the prescribed value Kh (if "NO" at step S215), the F_C Request flag is set 0 (step S216). Subsequently, the output port P3 is set to "1", and the voltage step-up circuit 13 is stopped to stop charging the main capacitor 20 (step S220). Thereafter, the F_onc flag is set to 0 while the variable Ctime is set to 0 (step S221). Thereafter control returns to the main process.

If it is determined that the A/D converted value of the output voltage RLS is greater than the sum of the A/D old value the prescribed value Kh (if "YES" at step S215), it is determined whether the F_C Request flag is 1 (step S217). Control returns to the main process to continue to charge the main capacitor 20 if the F_C Request flag is 1 (if "YES" at step S217). If the F_C Request flag is not 1 (if "NO" at step S217), it is determined whether an F_COn flag is 1 (step S218). The F_COn flag is set to 1 when the camera is in operation. If the F_COn flag is not 1 (if "NO" at step S218), the output port P3 is set to "1", and the voltage step-up circuit 13 is stopped to stop charging the main capacitor 20 (step S220). Subsequently, the F_onc flag is set to 0 and the variable Ctime is set to 0 (step S221). Thereafter control returns to the main process.

If the F_COn flag is 1 (if "YES" at step S218), it is determined whether the A/D converted value of the output voltage RLS is greater than a voltage Vtyp (step S219). The voltage Vtyp is set at a value which is smaller than the maximum charge voltage Vmax and greater than the minimum charge voltage Vmin. In the present embodiment, the voltage Vtyp is set at 3.1 volts. Accordingly, performing the operation at step S219 is equivalent to determining whether the voltage on the main capacitor 20 is greater than 310 volts.

If the A/D converted value of the output voltage RLS is equal to or smaller than the voltage Vtyp (if "NO" at step S219), control returns to the main process, and repeats the operations from step S200, S205 through S209, S211 through S215, and S217 through 219 to continue to charge the main capacitor 20. If the A/D converted value of the output voltage RLS is greater than the voltage Vtyp (if "YES" at step S219), the output port P3 is set to "1", and the voltage step-up circuit 13 is stopped to stop charging the main capacitor 20 (step S220). Subsequently, the F_onc flag is set to 0 while the variable Ctime is set to 0 (step S221). Thereafter control returns to the main process. Due to the operations at steps S218 and S219, control proceeds from step S218 to step S220 to stop charging the main capacitor 20 if the camera is not in operation. If the camera is in operation, control proceeds to step S220 to stop charging the main capacitor 20 at the time the voltage on the main capacitor 20 becomes greater than the voltage Vtyp at step S219.

The operations in the case where the voltage (A/D converted value) on the main capacitor 20 is greater than the maximum charge voltage Vmax will be hereinafter discussed.

If it is determined at step S211 whether the A/D converted value of the output voltage RLS is greater than the maximum charge voltage Vmax (if "YES" at step S211), the F_C Request flag is set to 0 (step S216). Subsequently, the output port P3 is set to "1", and the voltage step-up circuit 13 is stopped to stop charging the main capacitor 20 (step S220). Thereafter, the F_onc flag is set to 0 and the variable Ctime is set to 0 (step S221). Thereafter control returns to the main process.

The operations in the case where the voltage on the main capacitor 20 drops while the main capacitor 20 is being charged (i.e., when the F_C Request flag is 0) will be hereinafter discussed.

Figure 10A:
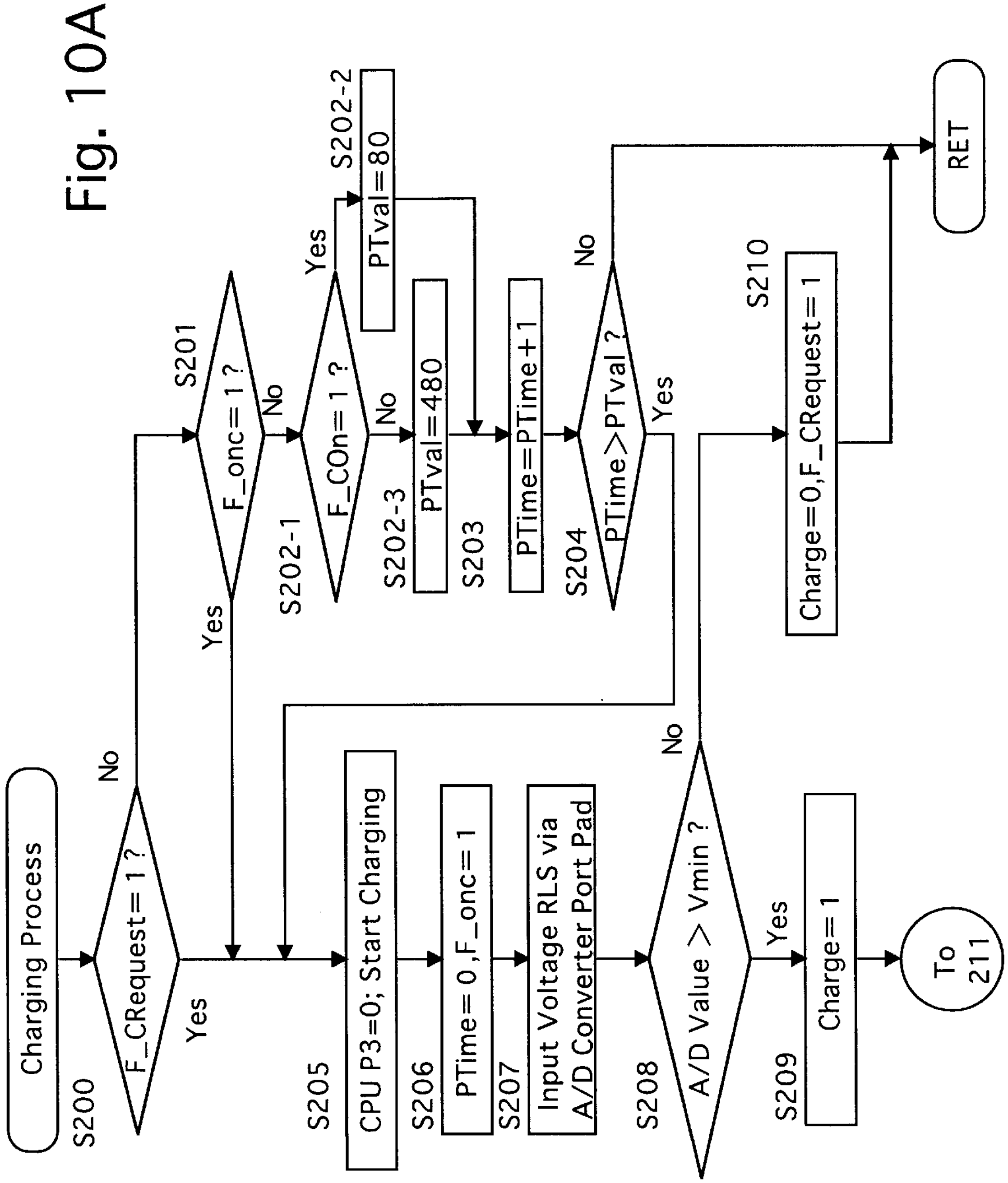
FIGS. 10A and 10B show a flow chart of the subroutine "Charging Process" shown in FIG. 9.
Figure 10B:
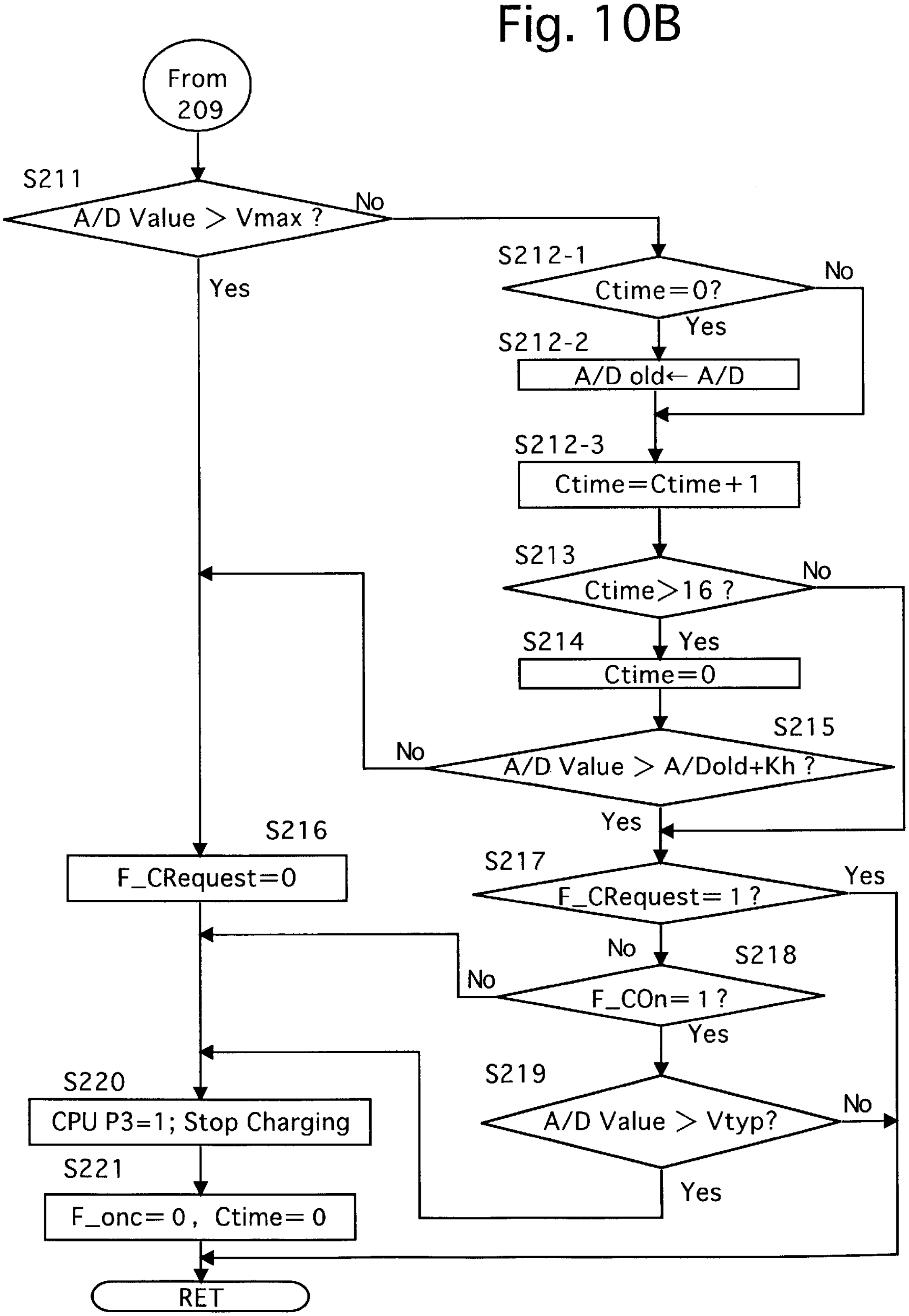

If it is determined at step S200 that the F_C Request flag is not 1, i.e., if control re-enters the charging process shown in FIGS. 10A and 10B after the voltage of the main capacitor 20 reaches the maximum charge voltage Vmax to thereby stop charging the main capacitor 20, or after the rate of climb (R/C) of the voltage on the battery is low to thereby stop charging the main capacitor 20 (if "NO" at step S200), it is determined whether the F_onc flag is 1 (step S201). The F_onc flag is set to 1 when the main capacitor 20 is in a state of being charged. If it is determined at step S201 that the F_onc flag is 1 (if "YES" at step S201), control proceeds to step S205. If it is determined at step S200 that the F_C Request flag is not 1 (if "NO" at step S200) and if it is determined at step S201 that the F_onc flag is not 1 either (if "NO" at step S201), it is determined whether the F_COn flag is 1 (step S202-1). The F_COn flag is set to 1 when the camera is in operation.

If the F_COn flag is 1 (if "YES" at step S202-1), a check time Ptval is set at 80 (step S202-2). If the F_COn flag is not 1 (if "NO" at step S202-1), the check time Ptval is set at 480 (step S202-3). The check time Ptval represents the cycle period in checking the voltage on the main capacitor 20. Since control enters the charging process shown in FIGS. 10A and 10B once every 125 ms, 480 of the check time Ptval corresponds to one minute, while 80 of the check time Ptval corresponds to ten seconds.

After the check time Ptval is set to 80 or 480, the timer Ptime is incremented by one (step S203), and it is determined whether the counter value of the timer Ptime is greater than the value of the check time Ptval (step S204). If the counter value of the timer Ptime is equal to or less than the value of the check time Ptval (if "NO" at step S204), control returns to the main process. If the counter value of the timer Ptime is greater than the value of the check time Ptval (if "YES" at step S204), control proceeds to step S205 to check the voltage on the main capacitor 20 and charge the main capacitor 20. Accordingly, control proceeds to step S205 after 10 seconds elapses if the camera is in operation, or after one minute elapses if the camera is not in operation.

As can be understood from the above description, in the present embodiment of the flash 30, the voltage on the main capacitor 20 is checked in the first cycle period (in a cycle of 125 ms) while the main capacitor is not being charged, and the voltage on the main capacitor 20 is checked in the second cycle period (in a cycle of 1 minute), that is much longer than the first cycle period) when the main capacitor is not charged. This reduces the number of times that the voltage step-up circuit 13 is driven to thereby reduce power consumption of the battery. Furthermore, in the present embodiment of the flash 30, even when the main capacitor 20 is not in a state of being charged, the voltage on the main capacitor 20 is checked in the third cycle period (in a cycle of 10 seconds) that is longer than the first cycle period and shorter than the second cycle period when the camera is in operation. This makes it possible to charge the main capacitor 20 without delay even if the voltage on the main capacitor 20 drops due to operation of the camera.

In the illustrated embodiment, although the second cycle period is set at one minute, the second cycle period needs to be set in consideration of the leakage current of the main capacitor 20. The second cycle period is preferably set to be shorter than the time necessary for the voltage on the main capacitor 20 to drop from the maximum voltage to the minimum voltage due to leakage of current. In the present embodiment, an electrolytic capacitor is used as the main capacitor 20. Since a characteristic of the electrolytic capacitor is that the leakage current increases as the voltage on the capacitor rises, energy efficiency deteriorates if the voltage on the main capacitor 20 is always held at maximum, which is not preferable. Conversely, according to the present embodiment of the flash 30, the main capacitor 20 is not recharged until the voltage thereon drops to the minimum charge voltage Vmin, so that energy efficiency improves. Furthermore, since the voltage on the main capacitor 20 is held at a predetermined voltage (310 volts) higher than the minimum charge voltage Vmin (270 volts) when the camera is in operation, the lighting power of the xenon flashtube 23 can be held at a high level.

[Communication Interruption Process]

Figure 11:
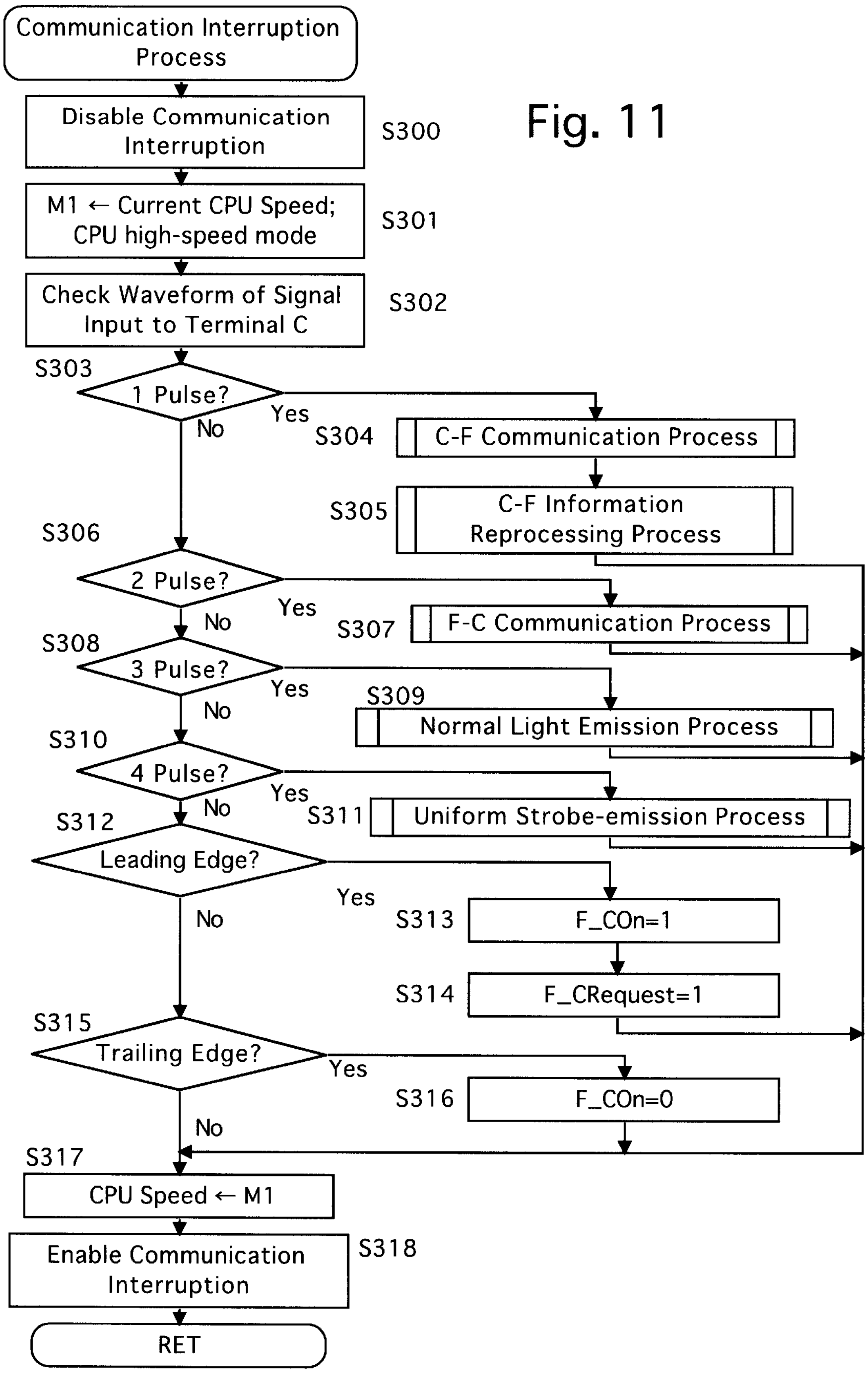
FIG. 11 is a flow chart of a communication interruption process.

A communication interruption process which is performed when the main switch 11 is ON will be hereinafter discussed in detail with reference to FIGS. 7, 8 and 11. The communication interruption process shown in FIG. 11 is performed at the time the terminal C of the terminal connector 5 changes from "0" to "1" or from "1" to "0" (FIG. 7(*a*)). In the communication interruption process, firstly, communication interruption from the camera is disabled so as to disable the subsequent communication interruption (step S300). Subsequently, the current CPU speed is stored in a memory M1, and then the CPU 12 enters the CPU high-speed mode (step S301). Subsequently, the waveform of the signal input to the terminal C of the terminal connector 5 is checked (step S302). The CPU 12 identifies the contents of the communication from the waveform of the signal input to the terminal C, and performs the process in a manner described below.

Figure 7:
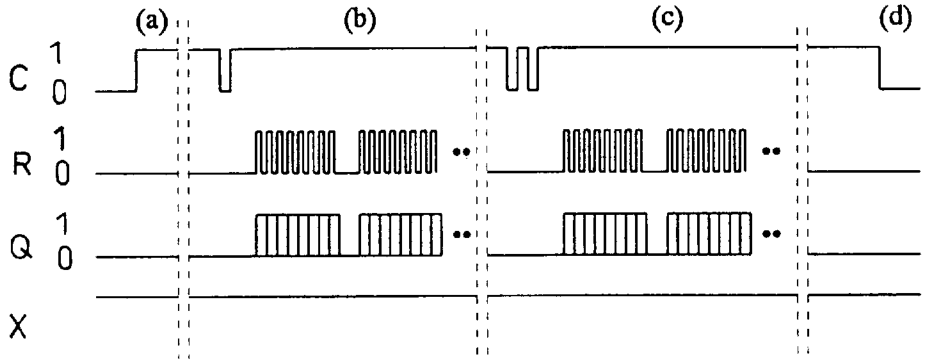
FIG. 7 is a time chart for a C-F communication process which is performed when the flash does not emit light.

If the waveform of the signal input to the terminal C of the terminal connector 5 represents a single pulse as shown in FIG. 7(*b*) (if "YES" at step S303), a C-F communication process in which the CPU 12 receives C-F communication data, which is synchronized with the clock signal transmitted to the terminal R of the terminal connector 5, via the terminal Q of the terminal connector 5 is performed (step S304). The C-F communication data corresponds to the C-F communication information shown in Table 2. After the C-F communication process is completed, a C-F information reprocessing process in which such modes as flash modes are reset in accordance with the input C-F communication data performed (step S305). The CPU speed is changed back to the speed which has been stored in the memory M1 in the operation at step S301 (step S317). Subsequently, communication interruption from the camera is enabled (step S318), and control returns.

If the waveform of the signal input to the terminal C of the terminal connector 5 represents two consecutive pulses as shown in FIG. 7(*c*) (if "NO" at step S303 and "YES" at step S306), an F-C communication process is performed (step S307) and control proceeds to step S317. In the F-C communication process, F-C communication data is made to be synchronized with the clock signal input to the terminal R of the terminal connector 5 from the camera to be transmitted to the camera via the terminal Q of the terminal connector 5. The F-C communication data corresponds to the F-C communication information shown in Table 1.

Figure 8:
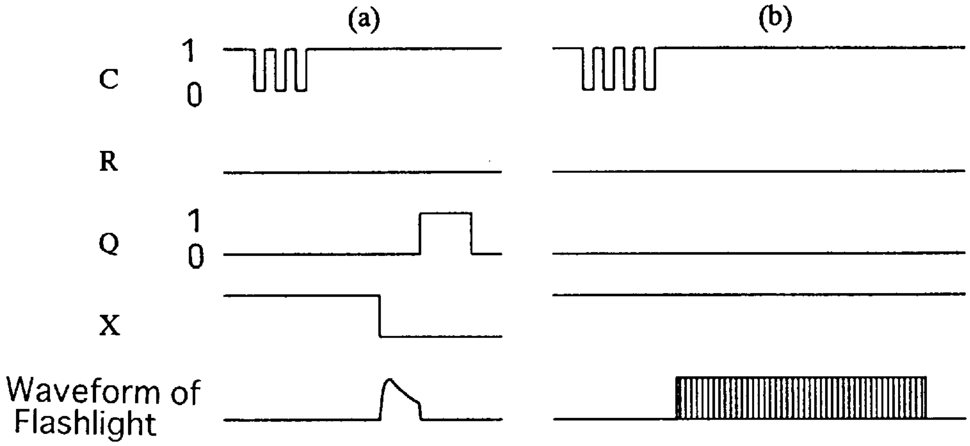
FIG. 8 is a time chart for a C-F communication process which is performed when the flash emits light.

If the waveform of the signal input to the terminal C of the terminal connector 5 represents three consecutive pulses as shown in FIG. 8(*a*) (if "NO" at step S306 and "YES" at step S308), a normal light emission process is performed (step S309), and control proceeds to step S317.

If the waveform of the signal input to the terminal C of the terminal connector 5 represents four consecutive pulses as shown in FIG. 8(*b*) (if "NO" at step S308 and "YES" at step S310), a uniform flash-emission process ("Uniform Flash-Emission Process" shown in FIG. 12) in which the xenon tube 23 is driven with uniform intensity of flashlight is performed (step S311), and control proceeds to step S317.

If the waveform of the signal input to the terminal C of the terminal connector 5 represents a leading edge of a pulse as shown in FIG. 7(*a*) (if "NO" at step S310 and "YES" at step S312), the F_COn flag is set to 1 (step S313), the F_C Request flag is set to 1 (step S314), and control proceeds to step S317.

If the waveform of the signal input to the terminal C of the terminal connector 5 represents a trailing edge of a pulse as shown in FIG. 7(*d*) (if "NO" at step S312 and "YES" at step S315), i.e., if the camera enters a non-operation state, the F_COn flag is set to 0 (step S316), and control proceeds to step S317. In the case where the non-operation state of the camera lasts for a predetermined period of time (e.g., five minutes), the CPU enters the sleep mode to reduce power consumption.

If the waveform of the signal input to the terminal C of the terminal connector 5 represents none of the pulses or pulse edges described above (if "NO" at step S315), the CPU speed is changed back to the speed which has been stored in the memory M1 in the operation at step S301 (step S317). Subsequently, communication interruption from the camera is enabled (step S318), and control returns.

[Uniform Flash-Emission Process]

Figure 12:
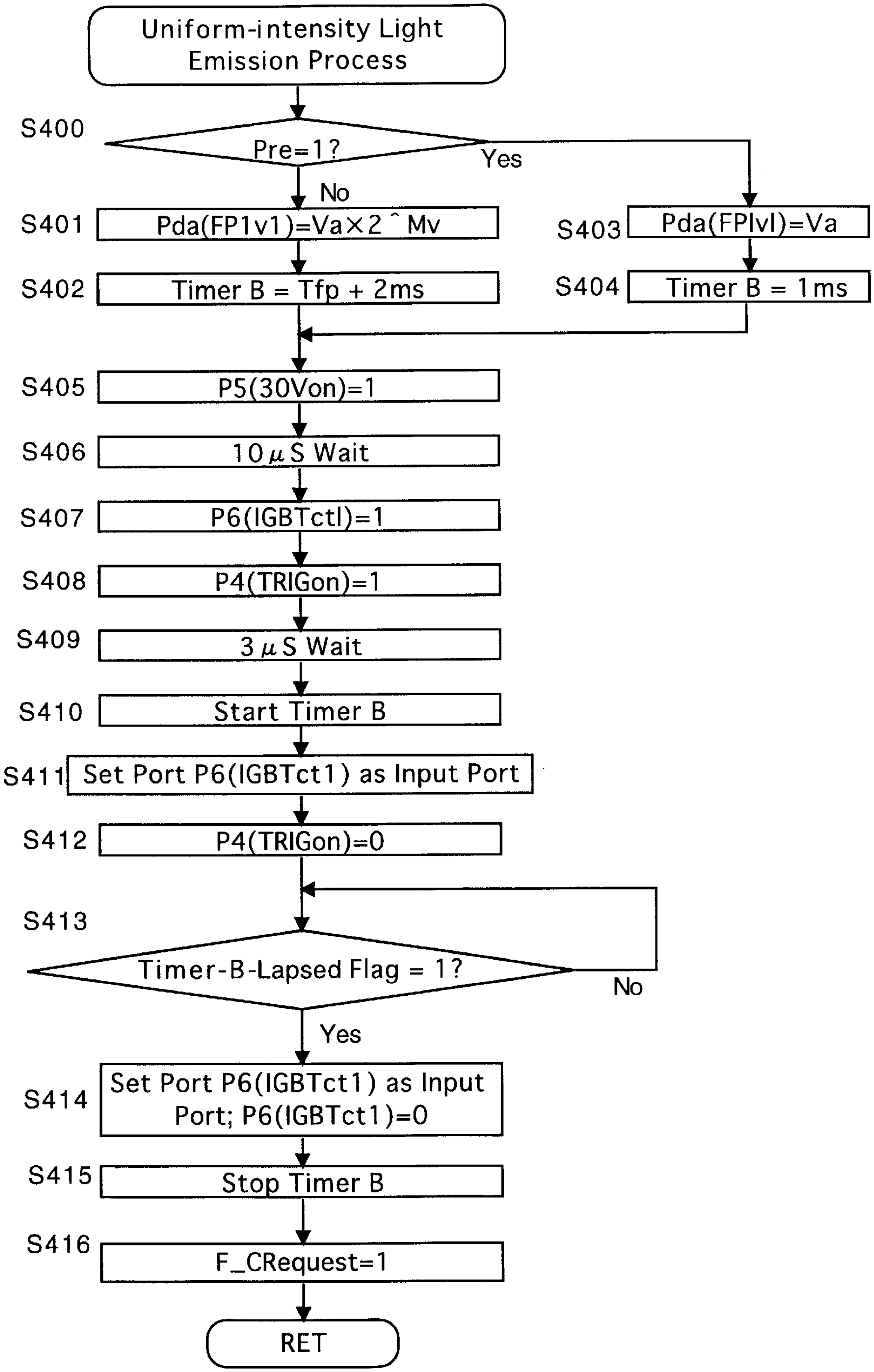
FIG. 12 is a flow chart of the subroutine "Uniform Flash-Emission Process" shown in FIG. 11.

The uniform flash-emission process which is performed at step S311 will be hereinafter discussed in detail with reference to FIGS. 2, 5, 8(*b*) and 12. The uniform flash-emission process shown in FIG. 12 is performed when the CPU 12 inputs a signal having four consecutive pulses (i.e., a uniform flash-emission control signal) shown in FIG. 8(*b*) from the camera via the terminal C of the terminal connector 5.

In the uniform flash-emission process, firstly it is determined whether the aforementioned flag "Pre" for determining whether the pre-flash operation is to be performed is 1 (step S400). The flag "Pre" is set to 1 when the pre-flash operation is performed, while the flag "Pre" is set to 0 when a main flash operation is performed. "Main flash operation" herein means to drive the xenon flashtube 23 to produce a flashlight at the main exposure. In the pre-flash operation, the xenon flashtube 23 is driven to emit flashlight before the main exposure in order that the camera may set the flash intensity multiplying factor Mv for the time of the main exposure. The flash intensity multiplying factor Mv represents information regarding how many times greater the intensity of the light emission of the flash at the main flash exposure should be than that at the pre-flash operation. The flash intensity multiplying factor Mv is transmitted from the camera to the flash via the C-F communication process (step S304).

If the flag "Pre" is 1 (if "YES" at step S400), the voltage FP1*v*1, which is output from the D/A conversion port Pda of the CPU 12 to be input to the non-inverting input terminal 101*a*, is set at a voltage Va (step S403), the interval of a timer B (not shown) for measuring the duration of a light emission is set at 1 ms (step S404), and control proceeds to step S405. If the flag "Pre" is 0 (if "NO" at step S400), the voltage FP1$v$1 is set at the voltage Va multiplied by $2^{Mv}$ (step S401), the interval of the timer B is set for the sum of the duration of uniform-intensity flashlight Tfp and 2 ms (step S402), and control proceeds to step S405. The duration of uniform-intensity flashlight Tfp is set on camera in accordance with the exposure time and the speed of the leading and trailing curtains. The purpose of adding the time "2 ms" to the duration of uniform-intensity flashlight Tfp at step S402 is to give a margin to the duration of uniform-intensity flashlight Tfp.

At step S405, the port P5 (the signal 30Von) is set to "1" (at time T1 in FIG. 5). This causes the 30-volt generating circuit 18 to generate the voltage of 30 volts. Subsequently, control waits 10 $\mu$s (step S406). This waiting time is for waiting for the voltage of 30 volts generated by the 30-volt generating circuit 18 to become stable. Upon a lapse of 10 $\mu$s, the port P6 (the signal IGBTct1) is set to "1" (step S407) (at time T2 in FIG. 5). This causes the input of the buffer 106 to become "1", so that the signal IGBTon becomes "1". As a result, the level shift circuit 19 applies the voltage of 30 volts given from the 30-volt generating circuit 18 to the gate IGBTg of the IGBT 24 to switch the IGBT 24 ON.

At step S408, the port P4 (the signal TRIGon) is set to "1" (at time T3 in FIG. 5). This causes the trigger circuit 22 to apply an oscillating high voltage to the trigger electrode XeT of the xenon flashtube 23, which causes the xenon flashtube 23 to start emitting light. After the signal TRIGon is set to "1", control waits 3 $\mu$s (step S409). Subsequently, the timer B, the interval thereof having been set at step S402 or S404, is started (step S410), and the port P6 is set as an input port (step S411). When the port P6 serves as an input port, a state of connection between the port P6 and the flash control circuit 17 is equivalent to a state where the port P6 and the flash control circuit 17 are disconnected from each other. In this state, a signal is output as the signal IGBTct1 from the comparator 101. The port P6 is changed from an output port to an input port at step S411 since there is a possibility of element(s) of the flash control circuit 17 such as the comparator 101 malfunctioning due to the high oscillating voltage applied to the trigger electrode XeT of the xenon flashtube 23. Changing the port P6 from an output port to an input port in such a manner makes it possible to drive the xenon flashtube 23 to emit flashlight with stability even if such a malfunction occurs.

Subsequently, the port P4 (the signal TRIGon) is set to "0", (step S412). Thereafter, it is determined whether a timer-B-lapsed flag is 1 (step S413). The timer-B-lapsed flag is set to 1 when the interval preset in the timer B expires. If the timer-B-lapsed flag is not 1 (if "NO" at step S413), control repeats the operation at step S413 to wait until the timer-B-lapsed flag becomes 1.

Upon a commencement of the discharge of the xenon flashtube 23, the intensity of light of the xenon flashtube increases rapidly, and at the same time, the voltage PDf1, which corresponds to the intensity of the light emission of the xenon flashtube 23, increases rapidly. At the time the voltage PDf1 exceeds the voltage FP1$v$1 (the time T4 in FIG. 5), the output of the comparator 101 changes from "1" to "0". This changes the signal IGBTon from "1" to "0" to switch the IGBT 24 OFF. Due to this operation of the IGBT 24, the energy accumulated in the coil 21 is discharged via the xenon flashtube 23 and the diode 25. Consequently, the intensity of the light emission of the xenon flashtube 23 decreases, while the voltage PDf1, which corresponds to the intensity of the light emission of the xenon flashtube 23, decreases. Thereafter, at the time the voltage PDf1 drops below the voltage FP1$v$1 (time T5 in FIG. 5), the output of the comparator 101 changes from "0" to "1". This changes the signal IGBTon from "0" to "1" to switch the IGBT 24 ON. Due to this operation of the IGBT 24, the electric charges accumulated in the main condenser 20 are discharged via the coil 21, the xenon flashtube 23 and the IGBT 24. Consequently, the intensity of the light emission of the xenon flashtube 23 increases. By repeating the above ON/OFF operations of the IGBT 24, the intensity of the light emission of the xenon flashtube 23 is maintained substantially uniform (see FIG. 8(*b*)).

If the timer-B-lapsed flag is 1 (if "YES" at step S413), the port P6 is changed from an input port to an output port, and then the port P6 is set to "0" (step S414). Subsequently, the signal "0" is output as the signal IGBTct1 from the port P6. Upon the output of the signal IGBTct1 "0", the uniform flash-emitting operation is stopped if the IGBT 24 is OFF. If the IGBT 24 is ON (at time T7 in FIG. 5), the IGBT 24 is switched OFF upon a lapse of the time constant τa, which is determined by the resistor 107 and the capacitor 108 (at the time T8 in FIG. 5).

Immediately after the signal IGBTct1 "0" is output from the port P6, the timer B is stopped (step S415). Subsequently, the F_C Request flag is set to 1 (step 416), and control returns to the communication interruption process shown in FIG. 11.

[Normal Light Emission Process]

Figure 13:
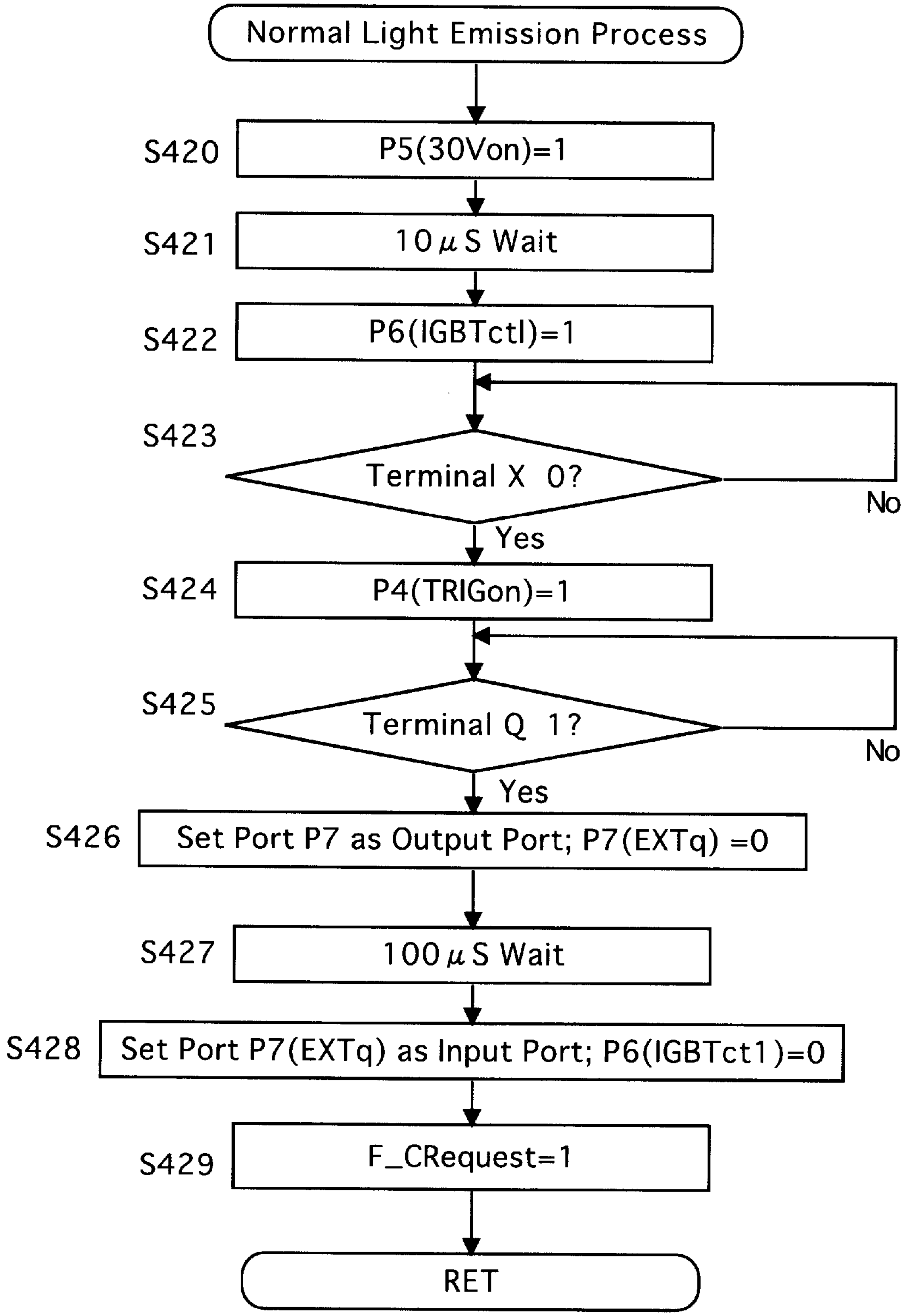
FIG. 13 is a flow chart of the subroutine "Normal Light Emission Process" shown in FIG. 11.

The normal light emission process that is performed at step S309 will be hereinafter discussed in detail with reference to FIGS. 8(*a*) and 13. The normal light emission process shown in FIG. 13 is performed when the CPU 12 inputs a signal having three consecutive pulses (i.e., a normal light emission control signal) shown in FIG. 8(*a*) from the camera.

In this process, firstly the port P5 (the signal 30Von) is set to "1" (step S420). This causes the 30-volt generating circuit 18 to generate the voltage of 30 volts. Subsequently, control waits 10 $\mu$s (step S421). This is a waiting time for waiting the voltage of 30 volts generated by the 30-volt generating circuit 18 to be stable. Upon a lapse of 10 $\mu$s, the port P6 of the CPU 12 is set to "1" (step S422). This causes the input of the buffer 106 to become "1", so that the signal IGBTon becomes "1". As a result, the level shift circuit 19 applies the voltage of 30 volts given from the 30-volt generating circuit 18 to the gate IGBTg of the IGBT 24 to switch the IGBT 24 ON.

Subsequently, it is determined whether the terminal X of the terminal connector 5 is "0" (step S423). If the terminal X is not "0" (if "NO" at step S423), control repeats the operation at step S423 to wait until the terminal X becomes "0". The terminal X becomes "0" upon completion of a movement of the leading curtain of the shutter (or at the time the shutter blades are fully opened in the case that the shutter is a lens shutter). If it is determined at step S423 that the terminal X is "0", the output port P4 (the signal TRIGon) is set to "1" (step S424). This causes the trigger circuit 22 to apply an oscillating high voltage to the trigger electrode XeT of the xenon flashtube 23, which causes the xenon flashtube 23 to start emitting light.

After the signal TRIGon is set to "1", it is determined whether the terminal Q of the terminal connector 5 is "1" (step S425). If the terminal Q is not "1" (if "NO" at step S425), control repeats the operation at step S425 to wait until the terminal Q becomes "1". If the terminal Q is "1" (if "YES" at step S425), the port P7 is changed from an input port to an output port, while the signal "0" is output as a signal EXTq from the port P7 (step S426). Subsequently, control waits 100 μs (step S427). The input of the buffer 106 becomes "0" at the time the signal EXTq "0" is output from the port P7, which causes the signal IGBTon to be "0" to thereby switch the IGBT 24 OFF. Due to this OFF of the IGBT 24, the discharge of the xenon flashtube 24 stops. The reason why control waits 100 μs at step S427 is to wait for the xenon flashtube 24 to stop the light emission thereof.

Upon a lapse of 100 μs at step S427, each of the ports P6 and P7 is initialized. Namely, the port P6 (the signal IGBTct1) as an output port is reset to "0", while the port P7 (the signal EXTq) is changed from an output port to an input port (step S428). Subsequently, the F__C Request flag is set to 1 (step S429), and control returns to the communication interruption process shown in FIG. 11.

The present invention is not limited solely to the above described particular embodiment. For instance, the present invention can be applied to not only a camera system consisting of a camera body and a flash which is detachably attached to the camera body, but also a camera having a built-in flash.

As can be understood from the foregoing, according to a uniform flash-emission controller to which the present invention is applied, the IGBT is prevented from being damaged during the uniform flash-emission control since an ON/OFF state of the IGBT is maintained for a predetermined period of time from the commencement of a variation of the ON/OFF state.

Moreover, according to a uniform flash-emission controller to which the present invention is applied, the full performance of the IGBT can be exploited by setting the aforementioned predetermined period of time so as to correspond to the maximum operable frequency of the IGBT.

Furthermore, according to a uniform flash-emission controller to which the present invention is applied, since the IGBT is not switched ON or OFF compulsively in the middle of the transition thereof from OFF to ON or from ON to OFF, the IGBT is prevented from being damaged even when the uniform flash-emitting operation is stopped.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A uniform flash-emission controller which controls an intensity of a light emission of a flashtube, said uniform flash-emission controller comprising:

an IGBT which causes said flashtube to emit a rapid series of short flash pulses;

an IGBT controller which switches said IGBT ON and OFF so as to maintain said intensity at a substantially constant level; and a latch for holding an ON state and an OFF state of said IGBT until a predetermined period of time elapses from a time said IGBT controller switches said IGBT ON and OFF, respectively.

2. The uniform flash-emission controller according to claim 1, wherein said IGBT controller comprises a detecting device for detecting said intensity of said light emission of said flashtube; and wherein said IGBT controller switches said IGBT OFF at a time said intensity detected by said detecting device exceeds a first predetermined intensity, and subsequently switches said IGBT ON at a time said intensity detected by said detecting device drops below a second predetermined intensity.

3. The uniform flash-emission controller according to claim 1, wherein said first predetermined intensity is identical to said second predetermined intensity.

4. A uniform flash-emission controller comprising:

an IGBT which causes said flashtube to emit a rapid series of short flash pulses;

an IGBT controller which switches said IGBT ON and OFF so as to maintain intensity of a light emission of said flashtube at a substantially constant level;

a detecting device for detecting said intensity of said light emission of said flashtube;

a comparator which compares said intensity of said light emission detected by said detecting device with a predetermined intensity, and outputs a level signal responsive to said intensity of said light emission detected by said detecting device;

a latch which latches said level signal, and outputs said level signal as one of an ON signal and an OFF signal to said IGBT to switch said IGBT ON and OFF, respectively;

a switching device provided between said comparator and said latch; and a switch controller for holding said switching device in an OFF state so that one of said ON signal and said OFF signal, which is output from said latch, cannot change until a predetermined period of time elapses from the moment said level signal changes.

5. The uniform flash-emission controller according to claim 4, wherein said comparator outputs a high-level signal and a low-level signal in the case where said intensity of said light emission detected by said detecting device is greater and less than said predetermined intensity, respectively; and wherein said IGBT controller switches said IGBT ON to thereby cause said flashtube to emit light when said latch latches said high-level signal to output said ON signal to said IGBT; and wherein said IGBT controller switches said IGBT OFF to thereby cause said flashtube to stop emitting light when said latch latches said low-level signal to output said OFF signal to said IGBT.

6. The uniform flash-emission controller according to claim 4, wherein said predetermined period of time corresponds to a maximum operable frequency of said IGBT.

7. The uniform flash-emission controller according to claim 4, wherein said switching device comprises a first buffer which inputs said level signal output from said comparator, said first buffer comprising an input terminal which inputs a signal output from said switching controller.

8. The uniform flash-emission controller according to claim 4, wherein said latch comprises a second buffer, and a resistor which is connected between input and output terminals of said second buffer so that an output of said second buffer is fed back to said input terminal of said second buffer via said resistor.

9. The uniform flash-emission controller according to claim 4, wherein said switch controller comprises an RC circuit which is connected to an output port of said latch, said predetermined period of time being determined by a time constant of said RC circuit.

10. The uniform flash-emission controller according to claim 4, further comprising a flash controller which determines said intensity of said light emission of said flashtube and a duration of said light emission of said flashtube to control a commencement of said light emission of said flashtube and a termination of said light emission of said flashtube.

11. The uniform flash-emission controller according to claim 10, wherein said flash controller outputs a light-emission stop signal for terminating said light emission of said flashtube to said latch via said switching device upon a lapse of said duration of said light emission of said flashtube;

wherein said light-emission stop signal is output to said IGBT via said latch without delay when said switching device is in an ON state; and wherein, when said switching device is in said OFF state, said light-emission stop signal is output to said IGBT upon a change of a state of said switching device from said OFF state to said ON state after said predetermined period of time elapses.

* * * * *